United States Patent
Kocagoez

(10) Patent No.: US 10,698,459 B2
(45) Date of Patent: Jun. 30, 2020

(54) ELECTRONIC DEVICES AND METHOD OF CONTROLLING AN ELECTRONIC DEVICE

(71) Applicant: Intel IP Corporation, Santa Clara, CA (US)

(72) Inventor: Kenan Kocagoez, Nuremberg (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/623,574

(22) Filed: Feb. 17, 2015

(65) Prior Publication Data
US 2016/0239057 A1    Aug. 18, 2016

(51) Int. Cl.
    *G06F 1/20*           (2006.01)
    *G06F 11/30*         (2006.01)
    *G06F 1/3287*       (2019.01)

(52) U.S. Cl.
CPC .............. *G06F 1/206* (2013.01); *G06F 1/203* (2013.01); *G06F 1/3287* (2013.01); *G06F 11/3024* (2013.01); *G06F 11/3031* (2013.01); *G06F 11/3058* (2013.01); *Y02D 10/171* (2018.01)

(58) Field of Classification Search
CPC ...... G06F 1/206; G06F 1/3246; G06F 1/3287; G06F 11/3024; G06F 11/3058; G06F 1/203; G06F 11/3031; Y02D 10/171
See application file for complete search history.

(56) References Cited

U.S. PATENT DOCUMENTS

| | | | | |
|---|---|---|---|---|
| 5,422,806 A * | 6/1995 | Chen | ...................... | G05D 23/19 700/29 |
| 6,470,289 B1 * | 10/2002 | Peters | ...................... | G01K 7/42 374/10 |
| 8,150,561 B2 * | 4/2012 | Shimotono | ............. | G06F 1/206 700/300 |
| 8,255,709 B2 * | 8/2012 | McCarthy | ............. | G06F 9/5061 700/30 |
| 9,747,139 B1 * | 8/2017 | Borlick | ................. | G06F 9/5094 |
| 2002/0143488 A1 * | 10/2002 | Cooper | ................... | G06F 1/206 702/132 |
| 2005/0288886 A1 * | 12/2005 | Therien | .................. | G06F 1/206 702/130 |

(Continued)

FOREIGN PATENT DOCUMENTS

WO          03046702 A2     6/2003
WO      WO 2016209348 A1 * 12/2016 ............. G06F 1/206

OTHER PUBLICATIONS

Patel et al.: "Performance of Turbo Encoder and Turbo Decoder for LTE", International Journal of Engineering and Innovative Technology (IJEIT), Oct. 2012, pp. 125-128, vol. 2, Issue 6.

(Continued)

*Primary Examiner* — Jennifer L Norton
(74) *Attorney, Agent, or Firm* — Kowert, Hood, Munyon, Rankin & Goetzel, P.C.

(57) ABSTRACT

An electronic device is provided. The electronic device may include a plurality of electronic circuits comprising a first electronic circuit and a second electronic circuit; and a processor configured to control at least one of the first electronic circuit or the second electronic circuit depending on at least one parameter indicating thermal properties of the first electronic circuit and a predetermined parameter indicating a thermal interdependency between the first electronic circuit and the second electronic circuit.

21 Claims, 8 Drawing Sheets

(56) References Cited

U.S. PATENT DOCUMENTS

| | | | |
|---|---|---|---|
| 2006/0075760 A1* | 4/2006 | Im | H01L 22/34 62/3.7 |
| 2007/0005152 A1* | 1/2007 | Karr | G06F 1/28 700/22 |
| 2007/0106428 A1* | 5/2007 | Omizo | G05D 23/19 700/300 |
| 2011/0060927 A1* | 3/2011 | Fillingim | G11C 5/141 713/320 |
| 2011/0145605 A1 | 6/2011 | Sur et al. | |
| 2012/0110352 A1* | 5/2012 | Branover | G06F 1/206 713/300 |
| 2013/0079946 A1 | 3/2013 | Anderson et al. | |
| 2013/0167103 A1 | 6/2013 | Burrell et al. | |
| 2013/0173941 A1* | 7/2013 | Ananthakrishnan | G06F 1/206 713/320 |
| 2013/0178999 A1* | 7/2013 | Geissler | H05K 7/20836 700/300 |
| 2013/0187157 A1 | 7/2013 | Kim et al. | |
| 2014/0032949 A1* | 1/2014 | Kim | G06F 1/3206 713/322 |
| 2015/0078251 A1 | 3/2015 | Clevorn et al. | |
| 2015/0139080 A1 | 5/2015 | Ellenbeck et al. | |
| 2016/0048181 A1* | 2/2016 | Rosenzweig | G06F 1/206 713/322 |
| 2017/0192477 A1* | 7/2017 | Lefurgy | G06F 1/28 |
| 2019/0004723 A1* | 1/2019 | Li | G06F 12/02 |
| 2019/0340139 A1* | 11/2019 | Shabbir | G06F 9/5094 |
| 2020/0042056 A1* | 2/2020 | Shabbir | H05K 7/20209 |

OTHER PUBLICATIONS

"A New Method of Determining the Thermal Resistance of Microelectronic Packages", Journal Micro. and Elect.Pack., 2005; http://www.imaps.org/imapsstore/detail.aspx?ID=3181—Note: due to technical problems (page error), reference has not been attached.

Roy et al.: "Leakage Control for Deep-Submicron Circuits", Proc. of SPIE, Apr. 2003, 12 pages, vol. 5117.

International Search Report for the corresponding PCT Application PCT/US2016/013513, dated Jul. 12, 2016, 15 pages of Search Report.

* cited by examiner

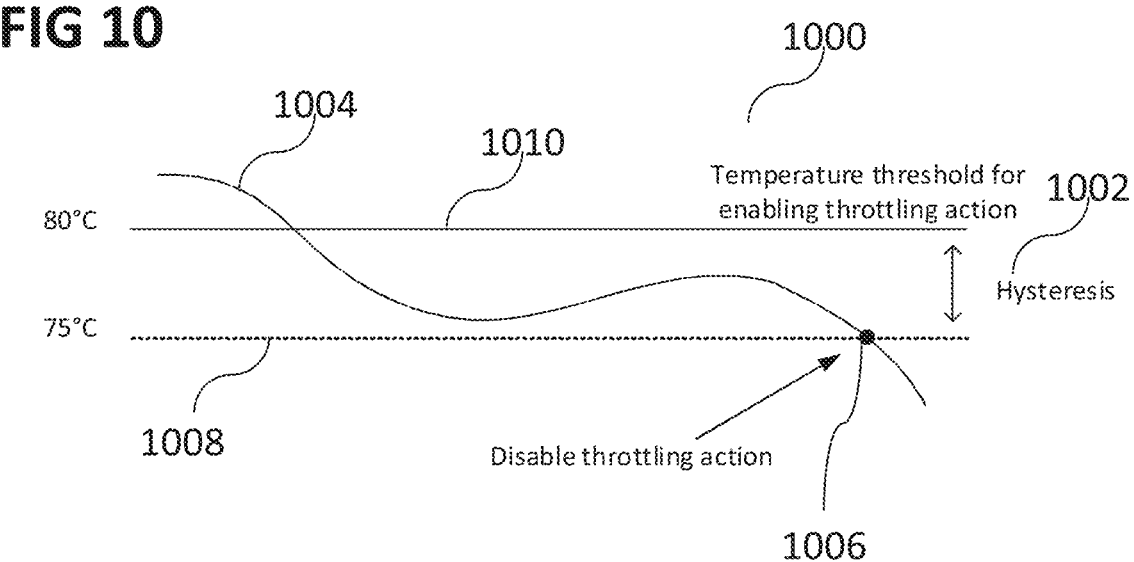

ELECTRONIC DEVICES AND METHOD OF CONTROLLING AN ELECTRONIC DEVICE

TECHNICAL FIELD

Various aspects of this disclosure relate generally to electronic devices and a method of controlling an electronic device.

BACKGROUND

A mobile device faces an ever accelerating race in higher integration of the mobile device in size and thickness along with higher demands in computation power and data transmission capabilities. In order to provide a seamless user experience, powerful hexa-core CPU systems along with GPU coprocessor were developed, for example, while multiplying the data send/receive capabilities by factors and reaching 300 MBit/s today with 1000 MBit/s on the near horizon. With Moore's law, helping to get more transistors build in less chip space, also device form factors shrink while adding further capabilities that contribute to component heating. At the same time, heat dissipation out of the system is reduced by the shrink and no active cooling, e.g. via a fan, may be possible due to design limitations.

Furthermore, leaps in technology nodes bring further challenges to tackle, especially by the so called leakage factor. Firstly, the generated leakage power increases exponentially with every technology generation. Secondly, the leakage rises exponentially with temperature. This leads to the fact that at high temperature, the leakage power may become the dominant factor for total power dissipation resulting in short battery life. Another drawback is the contribution of the additional leakage current to the heat generation which may lead to inconvenient device skin temperatures if not taken counteractions. In a worst case scenario, temperature regions may be reached, where a self-heating is triggered between the coupling characteristic of temperature and leakage. This may lead in an uncontrolled manner to a device overheating which may end in a software (SW) crash due to memory cell instabilities or even in damage of device hardware (HW).

Conventionally, thermal performance was provided using HW methods along with basic [i.e. single level] data throttling achieved. With transistor sizes going below 20 nm, the conventional cooling schemes are no longer acceptable. HW methods are based mainly on thermal heat spreading pads/materials to achieve a homogenous heat distribution and reducing thermal hot-spots. However, the cost per electronic device increases along with conflicts in new form factor design requirements.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 10 shows a diagram illustrating a hysteresis for throttling the activation.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various aspects of this disclosure may avoid a thermal run-away scenario on small form factor devices as mentioned above while keeping impact on user experience minimal.

Next generation small form factor electronic devices will show an increased power density due various design changes. In order to maintain thermal stability in this environment, an advanced thermal management scheme is provided that controls temperature variations with considering, for example, temperature severity;
component (in other words electronic circuit) location;
physical characteristics of the electronic device and/or the electronic circuits;
temperature slope (for example of at least some of the electronic circuits); and/or
use case of electronic device, for example modem use case.

Figure 3:
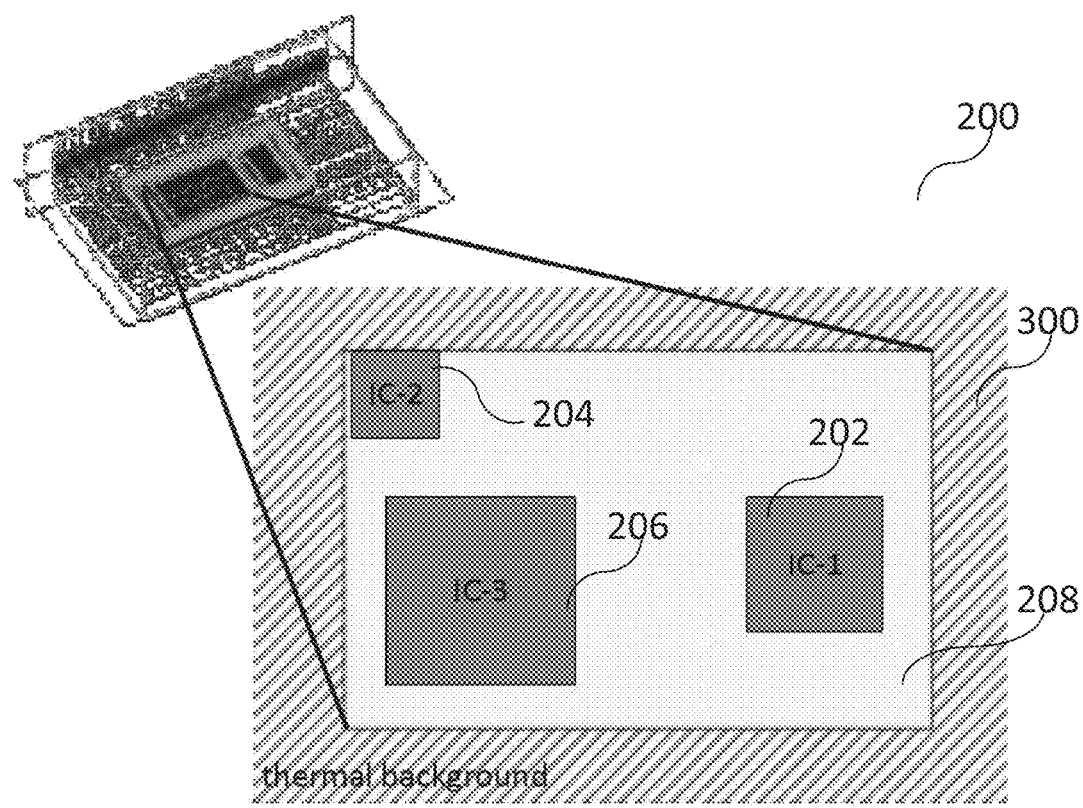
FIG. 3 shows the floorplan of the electronic device of FIG. 2 including an illustration of a thermal background.

In various aspects of this disclosure, the utilization of a chip thermal resistance matrix is proposed to optimize throttling with respect to component location and physical characteristics. A catalogue of cooling actions is provided that involves data, power and algorithmic throttling. FIR and IIR filtering on measurement results to may obtain temperature severity level and temperature slope. All information may be compiled to a look-up-table as depicted in FIG. 3 to control the applied throttling, which will be described in more detail below.

Furthermore, dedicated power switches may be provided that are tailored to keep modem "legacy" operation active and gate resources that are not required. Thus, a higher range of data and instruction memory can be switched off which may boost the temperature recovery effect i.e. when the use case is thermally limited to the legacy use case.

Various aspects of this disclosure are SW centric and deal with increased capabilities of for example wireless modems, for example in terms of multi-RAT (radio access technology) and multi-carrier. It considers in an efficient way the device physical characteristics, use cases of the electronic device (for example modem use cases), temperature severity/slope over time and applies a combination of many throttling levels to achieve, for example, convenient device back-skin temperature;
longer battery life;
high data throughput;
prioritizing voice calls versus data;
avoidance of overheating induced SW crashes or HW damage.

Various aspects of this disclosure may ensure an emulated seamless user experience while maintaining thermal stability.

Illustratively, in various aspects of this disclosure, the temperature characteristics and/or the thermal state or prognosis as well as the layout of a plurality of electronic circuits in an electronic device and thus the thermal interdependencies between the respective electronic circuits are/is taken into account in individually controlling the electronic circuits with respect to their thermal state or heat generation behaviour, in order to improve the cooling characteristics of the entire electronic device. This may e.g. be achieved by individually throttling one or more of the electronic circuits in order to have an optmized impact of the throttling with respect to the cooling of all or some desired electronic circuits. In other words, the cooling of the electronic device may be improved by individually controlling the performance (e.g. by so called throttling) of one or more electronic circuits depending on the thermal interdependencies between at least some of the electronic circuits of the electronic device.

Various aspects of this disclosure may provide elaborate temperature cooling mechanisms that can be initiated by a UE device upon on-chip temperature measurements. Usually, it is the goal of UE to send/receive data in the uplink/downlink as fast as possible meaning by the highest data rate. But in a temperature limited scenario, it may be beneficial for UE if the data throughput is artificially reduced, in other words throttled. Passive temperature cooling may be realized via reduction of current consumption, both in logic and memory cells. Various ways may be provided to limit power consumption either via throttling the data rate or switching to less demanding computation schemes e.g. simplified, less extensive algorithms. As UE is tightly coupled with eNodeB and fully scheduled by it data throttling approaches and their impact on the UE-eNodeB connection need to be carefully analyzed. By way of example, a straightforward reduction of CPU clock, can lead in case of unchanged data transmission rates, to a SW crash over time. UE receives more data than it can process by a lower clock rate causing memory stalls/overflows, since eNodeB maintains transmission rate.

Figure 1:
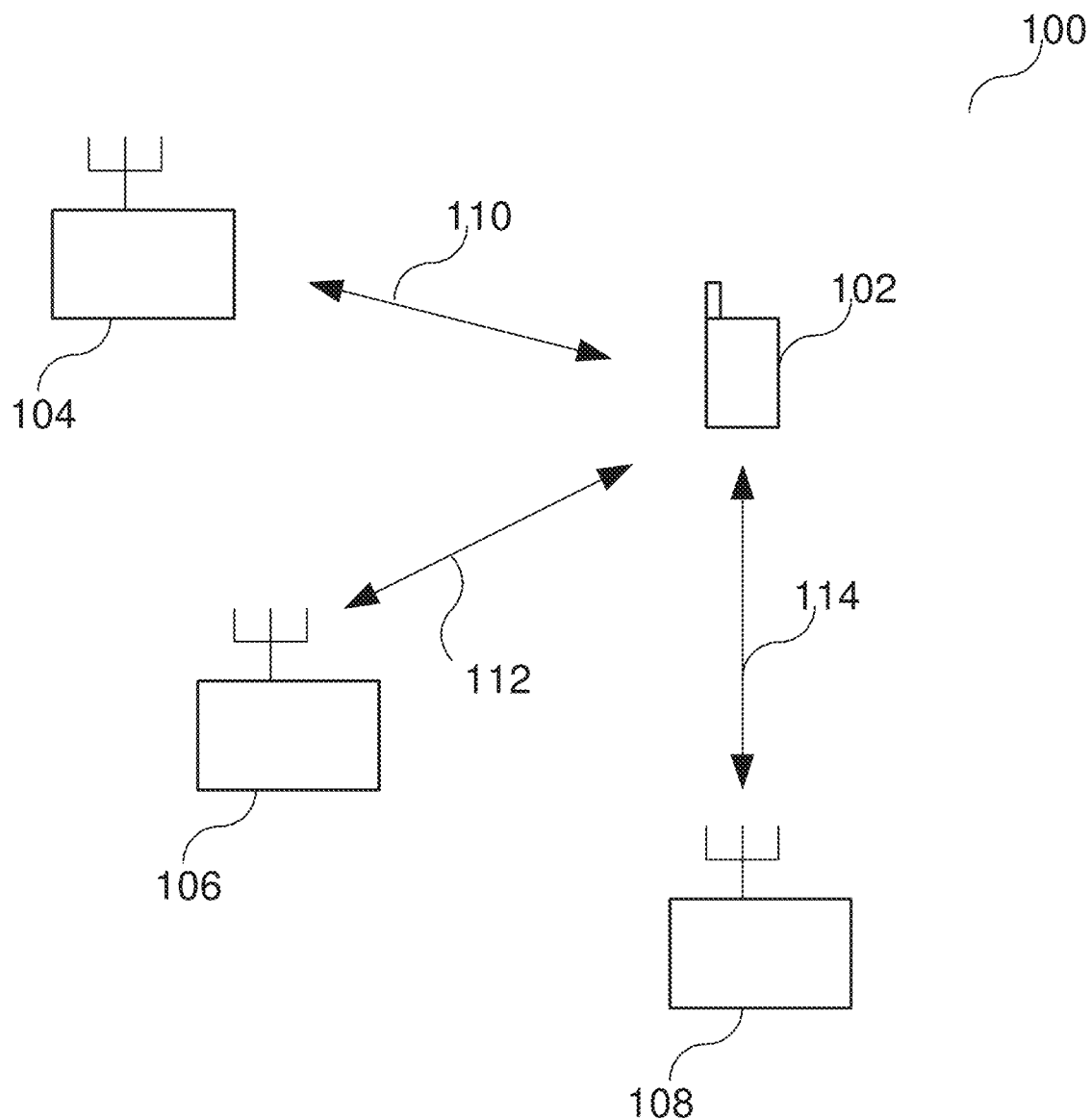
FIG. 1 shows a mobile radio communication system.

FIG. 1 shows mobile radio communication system 100. Mobile radio communication terminal device 102 such as e.g. User Equipment (UE) 102 may receive a plurality of radio signals from one or more base stations such as e.g. NodeBs or eNodeBs 104, 106, and 108, e.g. via respective air interfaces 110, 112, and 114. It is to be noted that although the further description uses a configuration of the mobile radio communication system 100 in accordance with Long Term Evolution (LTE) or in accordance with Long Term Evolution Advanced (LTE-A) for explanation, any other mobile radio communication system 100 may be provided, such as any 3GPP ($3^{rd}$ Generation Partnership Project) mobile radio communication system (e.g. in accordance with Universal Mobile Telecommunications System (UMTS)), 4GPP ($4^{th}$ Generation Partnership Project) mobile radio communication system, and the like.

Each of base stations 104, 106, and 108 may transmit a plurality of radio signals via air interfaces 110, 112, and 114. Base stations 104, 106, and 108 may utilize one or more mobile radio cells, where each mobile radio cell may transmit a unique wireless signal. Accordingly, UE 102 may receive a plurality of mobile radio signals from different mobile radio cells over air interfaces 110, 112, and 114. Each mobile radio cell may be located at one of base stations 104, 106, and 108.

Air interfaces 110, 112, and 114 may exhibit varying transmission quality over time. For example, fluctuating channel conditions for one of air interfaces 110, 112, or 114 may result in a stronger or weaker wireless communication link between one of bases stations 104-108 and UE 102. The quality of the signal received by UE 102 may consequently vary with time.

It is to be noted that UE 102 is only one example of an electronic device. Various aspects of this disclosure are similarly applicable to any electronic device (e.g. any electronic communication device and/or any mobile electronic device such as e.g. a smartphone, a laptop, a tablet computer, etc.) which includes a plurality of electronic circuits.

As the eNodeB reaction is not predictable in a way that the thermal problems of the UE are addressed adequately, various mechanisms will be provided which will elaborate on both how UE can drop autonomously its processing capabilities and power consumption without running into sync issues with eNodeB; as well as
how UE can influence eNodeB towards lower data rate scheduling.

The reduction of the UE receiver capabilities will in $2^{nd}$ instance also influence the eNodeB scheduling, through feedback signaling and the outer loop link adaptation. In this sense a strong coupling between these two approaches is expected. Nevertheless, eNodeB reaction will not be predictable such that the thermal problems of UE are resolved autonomously. Various mechanisms to address UE's thermal problems will be described in more detail below.

Figure 2:
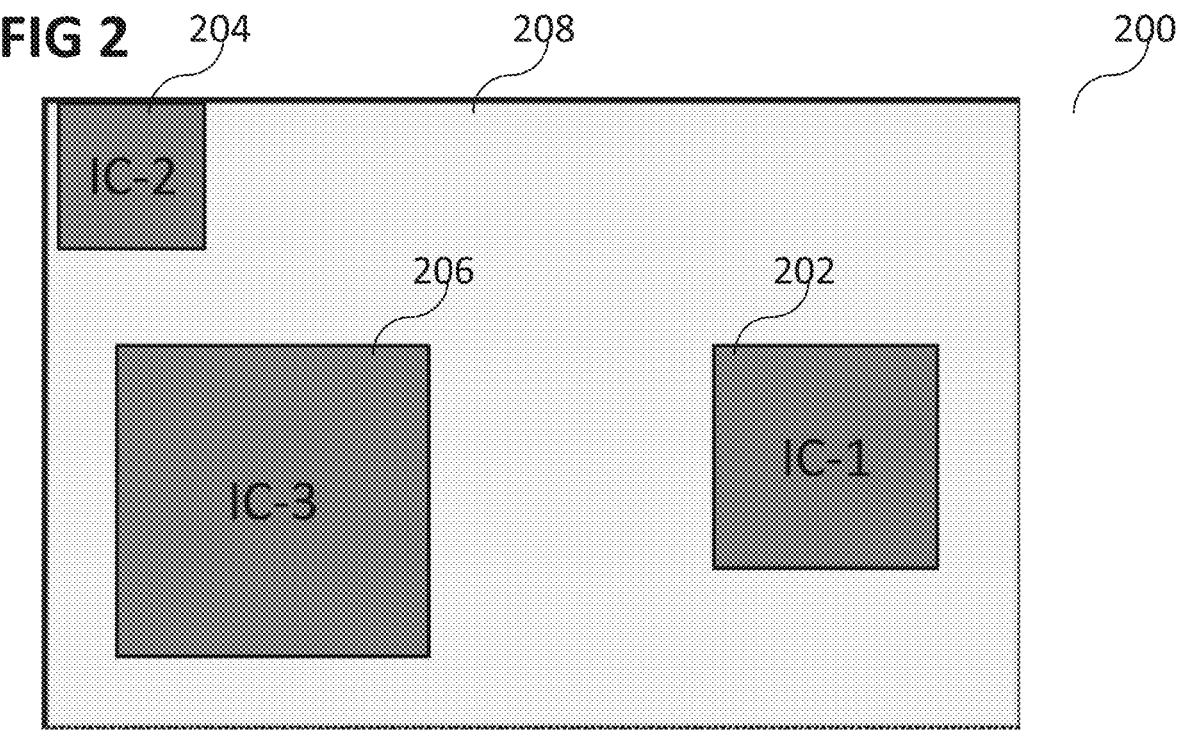
FIG. 2 shows a floorplan of an electronic device.

FIG. 2 shows a floorplan of an electronic device 200 (e.g. of UE 102 in a simplified manner). Electronic device 200 may include a plurality of (e.g. three or more) electronic circuits 202, 204, 206, which may or may not be electronically coupled with each other. Electronic circuits 202, 204, 206 may be integrated circuits (ICs). Electronic circuits 202, 204, 206 may be mounted on a common carrier 208 such as e.g. a printed circuit board (PCB) 208. Thus, some or all of electronic circuits 202, 204, 206 may be chips and mounted on PCB, but the electronic circuits 202, 204, 206 may also be different parts of a single chip or a part of a so-called system-on-chip (SOC). Thus, electronic circuits 202, 204, 206 may even include different portions of a single chip.

In the example of multiple ICs mounted on a PCB, each electronic circuit 202, 204, 206 consuming power generates heat that effects the electronic circuit (e.g. first electronic circuit 202) itself and neighboring electronic circuits (e.g.

second electronic circuit 204 and/or third electronic circuit 206). Information on self-heating and cross-heating of respective electronic circuits 202, 204, 206, is stored in a thermal resistance matrix $R_{TH}$. Self-heating may be understood as the thermal behavior or thermal characteristic of respective electronic circuit caused by electronic circuit itself. Cross-heating may be understood to include the thermal impact of one electronic circuit on one or more other electronic circuits.

Thermal resistance matrix $R_{TH}$ may be seen as a weighting matrix for the power consumed by all electronic circuits 202, 204, 206, in other words, characterizing thermal coupling between the electronic circuits 202, 204, 206 as well as thermal characteristics of electronic circuits 202, 204, 206 themselves. Utilizing thermal resistance matrix $R_{TH}$ in an electronic device, for example a modem-SoC, it is now possible to concentrate throttling actions to locations (for example individual electronic circuits, for example individual ICs) that mitigate the heat increase most effectively while cutting less power. Thus, a device-wide thermally optimized operation of the electronic device 200 is possible by considering the thermal characteristics of the electronic circuits themselves and the thermal interdependencies of adjacent electronic circuits, in other words the impact of heat generated by one electronic circuit on the heating of another electronic circuit.

The following table 1 shows a simplified example of a thermal resistance matrix $R_{TH}$ for the electronic device 200 as shown in FIG. 2:

TABLE 1 thermal resistance matrix $R_{TH}$ of electronic device 200

| $R_{TH}$ [K/W] | First electronic circuit 202 | Second electronic circuit 204 | Third electronic circuit 206 |
|---|---|---|---|
| First electronic circuit 202 | 20 | 5 | 20 |
| Second electronic circuit 204 | 10 | 15 | 25 |
| Third electronic circuit 206 | 15 | 10 | 30 |

As shown in table 1, third electronic circuit 206 may generate a self-heating of 30 K per consumed 1 W power and respectively may contribute with 25 K, on second electronic circuit 204, and 20 K, on first electronic circuit 202, cross-heating. Whereas second electronic circuit 204 generates only a self-heating of 15 K/W and cross-heating of 10 K/W (for example on third electronic circuit 206) and 5 K/W (for example on first electronic circuit 202). Similarly, first electronic circuit 202 generates a self-heating of 20 K/W and cross-heating of 10 K/W (for example on second electronic circuit 204) and 15 K/W (for example on third electronic circuit 206). Thus, first electronic circuit 202 may in this example be kept out of a throttling scheme which will be described in more detail below (no power throttling) in case the hot-spot is between third electronic circuit 206 and second electronic circuit 204.

This simple example illustrates the very efficient option of individual power throttling and the possibility of filtering on good locations for power throttling. By way of example, on next generation modem designs with increasing number of ICs mounted on a common carrier such as a common PCB, an individual power throttling taking into consideration the layout and the thermal coupling of the included electronic circuits might substantially increase the overall performance of such a modem, in general of an electronic device. In this concrete example, throttling power of second electronic circuit 204 only, while third electronic circuit 206 keeps high power consumptions would yield a low performance in temperature cooling and high costs in terms of user experience due the inappropriate usage of the throttling functions. By way of example, power may be limited (severe throttling) on a 4G-RAT electronic circuit only while power amplifier (PA) electronic circuit in a mobile radio communication terminal device, for exampleUE 102, may keep high power consumption and thus remain main source of heating 4G-RAT. This may result in a long period of limited 4G-RAT and an inefficient temperature mitigation.

Having described a generic example of a plurality of electronic circuits in an electronic device in FIG. 2, the determination of the thermal characteristics of an electronic circuit as well as a more detailed explanation of various throttling mechanisms for power throttling of electronic circuits will be described in more detail below.

Again with reference to FIG. 2 and with reference to FIG. 3, the determination of the thermal resistance matrix $R_{TH}$ will be described. FIG. 3 shows the floorplan of the electronic device 200 of FIG. 2 including an illustration of a thermal background 300 of the electronic device 200.

In steady state (thermal equilibrium), temperature on a specific point on an element, for example a carrier, for example the PCB can be characterized as:

$$T = T_a + R \cdot P$$

with $T_a$ reflecting the thermal environment (thermal background 300) of the PCB 208;

column vector P, giving the variable active power consumption of the various electronic circuits 202, 204, 206, for example ICs 202, 204, 206;

matrix R, weighting the thermal dependency between the electronic circuits 202, 204, 206, for example ICs 202, 204, 206, on power consumption.

The thermal environment depends on the ambient temperature of the electronic device 200 and heat generated e.g. by the display or battery which are external to the target element, for example target carrier 208, for example target PCB 208.

In general, the consumed power is use case and electronic circuit (for example IC) specific. Thus, it may vary from device to device.

Based on material and geometry data of the electronic device (e.g. implemented as a multi-chip module), as such conventional finite-element-analysis (FEA) methods or computational fluid dynamics (CFD) simulations may be provided to determine thermal resistance matrix $R_{TH}$. Once determined, the matrix R may be kept constant unless the design of the electronic device is changed (e.g. in case memory sizes are changed or any electronic circuit is replaced by a different type of electronic circuit).

The thermal resistance matrix $R_{TH}$ may have the following structure:

$$R = \begin{bmatrix} r[1,1] & \cdots & r[1,L] \\ \vdots & \ddots & \vdots \\ r[K,1] & \cdots & r[K,L] \end{bmatrix} \quad P = \begin{bmatrix} P[1] \\ \cdots \\ P[L] \end{bmatrix}$$

Setting up a CFD model of the target electronic device, with L power sources (L being in the number of electronic circuits in the electronic device) on the carrier 208, for example on the PCB 208, L simulation runs are provided to determine column wise the matrix R as described above. At each simulation run, only a single electronic circuit (e.g. IC component) may be powered on with e.g. 1 W and all other electronic circuits (e.g. IC components) may be idle. For example, determining column three of the thermal resistance matrix $R_{TH}$, a CFD simulation with P[3]=1 W and P[x]=0 for all x≠3 would be run.

In general, based on material and geometry data of the electronic device (e.g. multi-chip module) and its electronic circuits, finite-element-methods may be used in determining thermal properties for heat capacity $C_{TH}(Q/\Delta T)$ and thermal resistance $R_{TH}(K/W)$.

These two parameters are used to characterize
the speed of temperature change;
the maximum temperature that will be converged to; and
cross-heating between the electronic circuits.

The thermal resistance matrix $R_{TH}$ may be used to rank cooling performance of a throttling scheme (which will be described in more detail below) and select which of the electronic circuits, for example electronic circuits 202, 204, 206) can effectively assist to mitigate the observed heat issue. Even when the individual throttling approaches induce a power reduction in a single electronic circuit, it will contribute to heat reduction of neighboring electronic circuits (for example chips) as well.

This relationship can be given as:

$$\Delta T = \text{"SelfHeating"} + \text{"HeatingbyOthers"}$$

This relationship may be considered when triggering power throttling. The respective thermal resistance information can be retrieved out of the thermal resistance matrix $R_{TH}$ (junction-to-ambient), which characterizes physical thermal behavior of the electronic device (e.g. multi-chip module).

Thus, the thermal resistance matrix $R_{TH}$ may be set up and uses on two layers, namely for example on chip module level and on DBB (digital base band circuit) sub-module level covering modem RATs.

Figure 4:
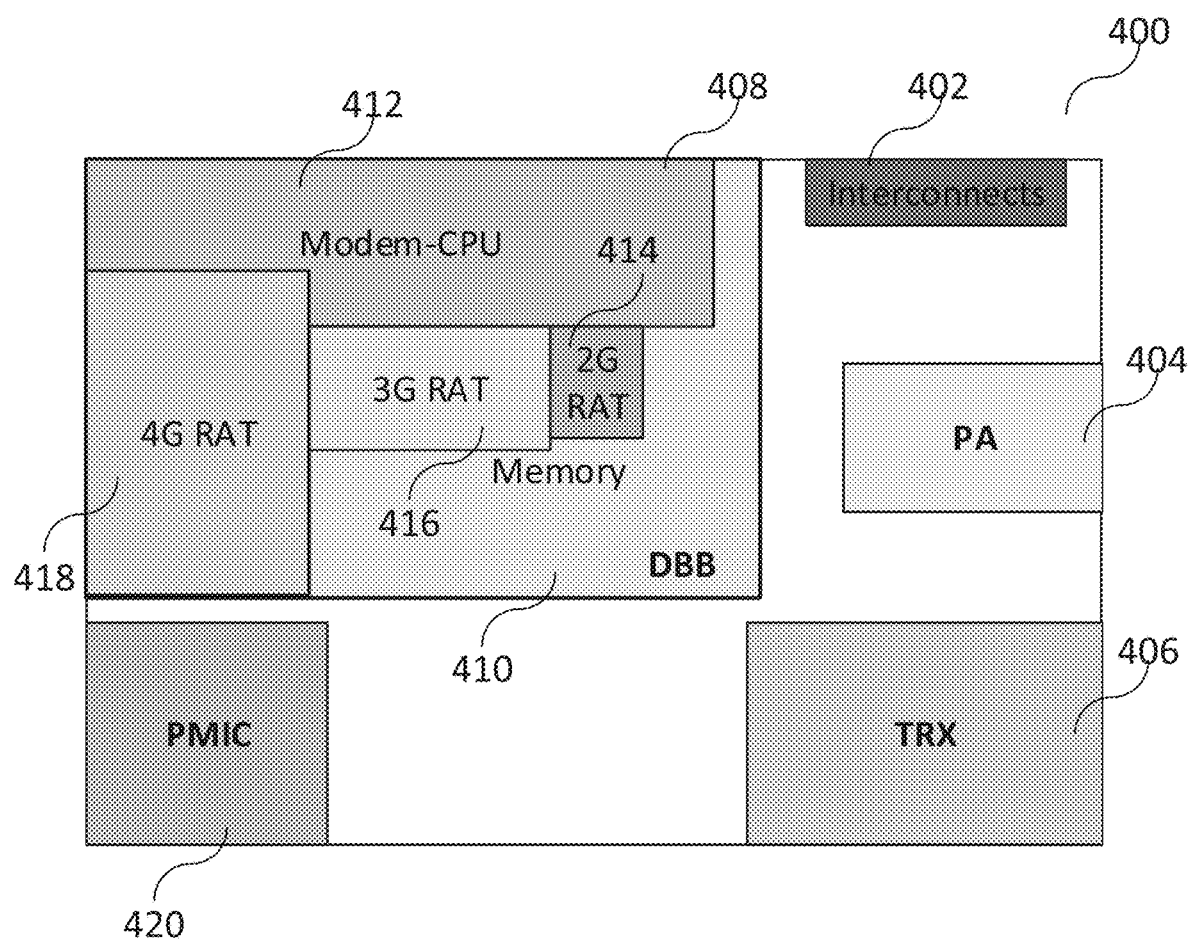
FIG. 4 shows a floorplan of an electronic device.

FIG. 4 shows a floorplan of an electronic device 400. The electronic device 400 may be a mobile radio communication terminal device such as e.g. UE 102. In this example, the electronic device 400 may be implemented as a system on chip (SoC).

The electronic device 400 may include various electronic components (in other words electronic circuits), such as e.g.:
one or more interconnects (also referred to as interfaces, such as e.g. power connectors, USB connectors, and the like) 402;
a power amplifier circuit 404 including a power amplifier to be connected to an antenna (not shown);
a radio frequency (RF) circuit 406 coupled downstream to the power amplifier circuit 404, the RF circuit 406 including a modulator/demodulator circuit to implement PHY layer functionality;
a digital baseband (DBB) circuit 408 coupled downstream to the RF circuit 406, the DBB circuit 408 (which illustratively implements the transport layers' functionalities of the various mobile radio communication standards) including a plurality of components such as e.g.
a memory 410;
a modem central processing unit (CPU) 412;
a 2G RAT (radio access technology) circuit 414 such as e.g. a GSM (Global System for Mobile Communications) circuit 414;
a 3G RAT circuit 416 such as e.g. a UMTS (Universal Mobile Telecommunications System) circuit 416;
a 4G RAT circuit 418 such as e.g. an LTE (Long Term Evolution) circuit 418 and/or an LTE-A (Long Term Evolution-Advanced) circuit 418;
a power management integrated (PMIC) circuit 420.

It goes without saying that the number, type and arrangement (layout) of the electronic circuits of the electronic device will vary from device to device.

However, what is evident from FIG. 4 is that the electronic circuit 402, 404, 406, 408, 410, 412, 414, 416, 418 are all generating heat when being operated, depending on the mode they are operated more or less heat (self-heating). Furthermore, the respectively generated heat of one electronic circuit will of course also to some extent heat the neighboring electronic circuit(s) (cross-heating).

In the following a guideline to design and setup a priority based multi-level thermal management algorithm on a wireless modem SoC is provided. By this we utilize various methods to throttle the performance of each individual electronic circuit of the electronic device 400. In the beginning, the general approach with reference to the individual throttling mechanisms which may be provided for a respective electronic circuit, will be described. After that, various individual throttling mechanisms which may be provided for a respective electronic circuit will be described in more detail. The thermal management algorithm will adaptively apply a combination of heat mitigation methods to maintain an optimized user experience.

The following table 2 shows an overview of in this example available throttling schemes for the respective electronic circuits (which may be implemented as chip modules) of the electronic device 400 as described above. Thus, illustratively, a catalogue of power, data and algorithmic throttling methods is provided. Each individually apply to a single electronic circuit or a plurality of electronic circuits (for example to a single or multiple chip modules).

TABLE 2

Localization of throttling methods

| Throttling method | Electronic circuit (e.g. chip module) |
| --- | --- |
| MAX TX Power Backoff | power amplifier (PA) circuit 404 |
| Reduce UL data rate | digital baseband (DBB) circuit 408 |
| Reduce UE receiver decoding iterations | digital baseband (DBB) circuit 408 |
| Force packet retransmissions | digital baseband (DBB) circuit 408 |
| Single Antenna Operation | radio frequency (RF) circuit 406 |
| Simplified Algorithms | digital baseband (DBB) circuit 408 |
| Force connection drop on additive component carriers | digital baseband (DBB) circuit 408, radio frequency (RF) circuit 406 |
| Reduce UE capabilities | digital baseband (DBB) circuit 408, radio frequency (RF) circuit 406, power management integrated (PMIC) circuit 420, power amplifier (PA) circuit 404 |
| Power Subdomain for Legacy Operation | digital baseband (DBB) circuit 408, power management integrated (PMIC) circuit 420 |

Based on table 2 location based device cooling may be implemented. On-die sensors are hereby provided to capture temperature of each chip module individually.

For the particular example layout of the electronic circuits of the electronic device 400, the following exemplary thermal resistance matrix $R_{TH}$ may be determined. It is to be noted that the respective numbers and correlations, in other words interdependencies of the thermal behavior of the respective electronic circuits will strongly depend on the concrete structure and functions of the electronic circuits and their arrangement within the electronic device.

TABLE 3

Exemplary thermal resistance matrix $R_{TH}$ of the electronic circuits of the electronic device 400

| $R_{TH}$ [K/W] | DBB circuit 408 | RF circuit 406 | PMIC circuit 420 | PA circuit 404 |
|---|---|---|---|---|
| DBB circuit 408 | 25 | 19 | 21 | 22 |
| RF circuit 406 | 18 | 29 | 20 | 21 |
| PMIC circuit 420 | 19 | 18 | 28 | 17 |
| PA circuit 404 | 18 | 22 | 19 | 30 |

As described above, the DBB circuit 408 includes a plurality of sub-modules, which may individually also be understood as examples of integrated circuits. The following table 4 shows an exemplary thermal resistance matrix $R_{TH}$ of those sub-modules.

TABLE 4

Exemplary thermal resistance matrix $R_{TH}$ of the electronic circuits of the DBB circuit of the electronic device 400

| $R_{TH}$ [K/W] | CPU 412 | 4G RAT 418 | 3G RAT 416 | 2G RAT 414 | Memory 410 |
|---|---|---|---|---|---|
| CPU 412 | 28 | 24 | 22 | 20 | 22 |
| 4G RAT 418 | 25 | 27 | 21 | 19 | 24 |
| 3G RAT 416 | 23 | 22 | 25 | 20 | 23 |
| 2G RAT 414 | 23 | 21 | 20 | 24 | 21 |
| Memory 410 | 25 | 23 | 20 | 19 | 27 |

As illustrated above, the thermal resistance matrix $R_{TH}$ may be determined via a finite element analysis.

The thermal resistance values specify the temperature rise induced in Kelvin, per consumed power in watt. Diagonal elements of the thermal resistance matrix $R_{TH}$ are related to heating of an electronic circuit (e.g. a component) via heat dissipation within the same electronic circuit. Cross diagonal (alsoe referred to as off diagonal) elements of the thermal resistance matrix $R_{TH}$ are related to heating between electronic circuits, e.g. to heating between RF circuit 406 and PMIC. Hereby, the cross diagonal thermal resistance is inversely proportional to the Euclidean distance between the components. Meaning lower $R_{TH}$ values between components correspond to distant positioning of the respective macros. Secondly, a lower $R_{TH}$ value can be due the physical chip characteristics, e.g. the thermal conductivities and widths of the materials between the respective submodules including termal properties of intermediate layers or insulators.

With the thermal resistance matrix $R_{TH}$ the temperature sensitivity of the module to power changes is known, both in terms of heating and cooling. Furthermore, it is now possible to characterize temperature change at e.g. the DBB die as follows:

$$\Delta T_{DBB} = (R_{TH,DBB} \cdot P_{DBB}) + (R_{TH,TRX\text{-}DBB} \cdot P_{TRX}) + (R_{TH,PA\text{-}DBB} \cdot P_{PA}) + (R_{TH,PMIC\text{-}DBB} \cdot P_{PMIC}) \ldots + (R_{TH,Others\text{-}DBB} \cdot P_{Others})$$

P reflects the power consumption of a particular chip module. The temperature change in a particular electronic circuit (e.g. module) depends on the consumed power scaled by the respective diagonal element plus the power consumed at the other modules, scaled with the respective cross elements of the resistance matrix $R_{TH}$. Thus, it is reasonable to consider not only the electronic circuit with the heat issue (e.g. hot-spot) but rather add other electronic circuits that significantly contribute to the temperature change $\Delta T$.

The thermal resistance matrix $R_{TH}$ may be stored in a memory of the electronic device 400, for example in the memory 410. The thermal resistance matrix $R_{TH}$ may be determined or predetermined by the manufacturer of the electronic device 400 before its delivery to a customer or it could be determined by the electronic device itself in accordance with computer programs stored in the electronic device 400 after the delivery of the electronic device to the customer. The thermal resistance matrix $R_{TH}$ or more generally speaking he thermal interdependencies may also be determined indirectly from the above equation by measuring the temperature change at e.g. the DBB die and relating it to the power cosuption of the different chip modules P. While a single measurement will typically not be sufficient to determine accurately multiple elements of the thermal resistance matrix $R_{TH}$, multiple measurements with different values of powers $P_x$ of the different modules allow determination of at least the most relevant matrix elements. In this variant the elements of the thermal resistance matrix are not predetermined at time of manufacturing, but are at least partially determined during operation, the latter is advantageous in case of modifications to the configuration of the divide are possible e.g. slotting in additional modules in extesion slots or exchanging batteries with different thermal characteristics or simply applying protective or decorative covers increasing as a side effect the thermal insulation.

Figure 5:
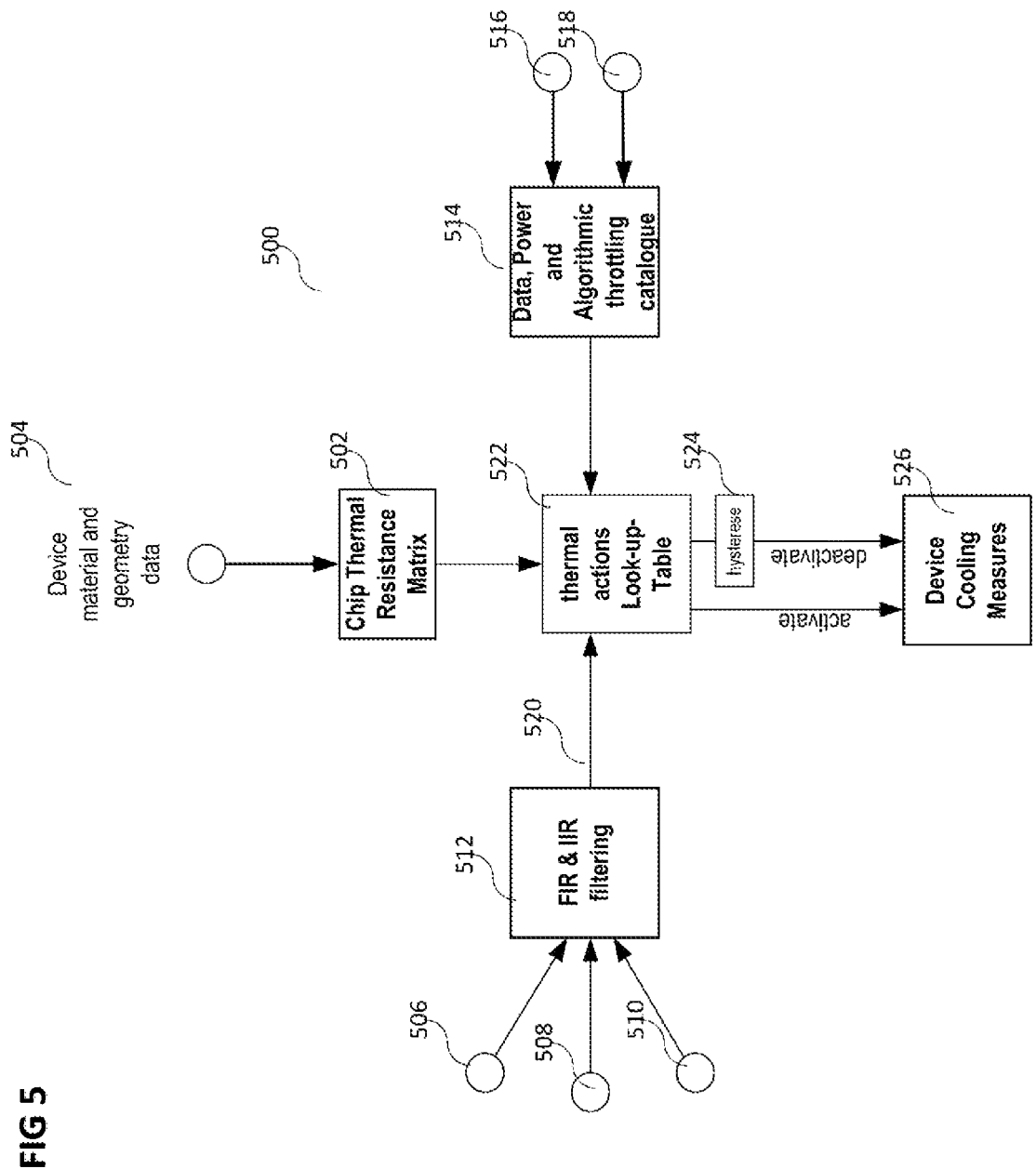
FIG. 5 shows a block diagram illustrating various aspects of this disclosure.

FIG. 5 shows a block diagram 500 illustrating various aspects of this disclosure.

Block 502 describes the determination and storing of the thermal resistance matrix $R_{TH}$ for the electronic device based on the material and geometric (layout) data 504 about the electronic circuits contained in the electronic device, as described above in detail. Alternatively, it can be inferred from power and thermal measurements as explained above (not show in the figure). Combined approaches are possible as well.

The respective procedures as shown in FIG. 5 may be implemented by one or more processors such as for example the modem CPU 412 of the DBB circuit 408 or any other processing logic that may be provided in the electronic device as one of the electronic circuits or even as an additional electronic circuit which is not considered in the thermal resistance matrix $R_{TH}$.

In various aspects of this disclosure, the electronic device may include one or more sensors, for example one or more temperature sensors 506, 508, 510, which are arranged and configured to measure the temperature of at least a portion of one or more electronic circuits of the electronic device and/or of the temperature of the environment of the electronic device. Optionally, the measured sensor data may be subject to a filtering, for example to a finite impulse response (FIR) filtering and/or to an infinite impulse response (IIR) filtering (symbolized in FIG. 5 by block 512).

A more detailed illustration of the optional filtering of the sensor data will be described with reference to FIG. 6.

Figure 6:
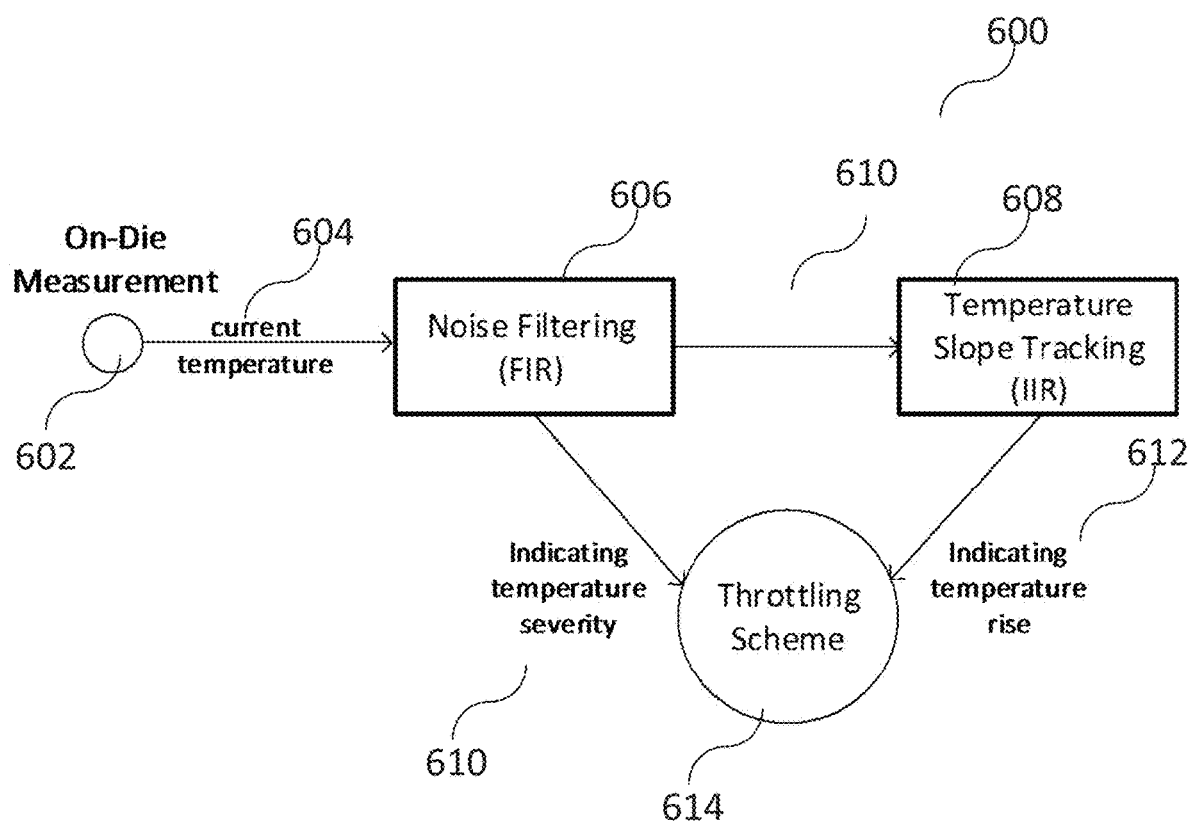
FIG. 6 shows a block diagram illustrating an optional filtering of measured temperature data in accordance with various aspects of this disclosure.

FIG. 6 shows a block diagram 600 illustrating an optional filtering of measured temperature data in accordance with various aspects of this disclosure.

For reasons of simplicity, only one sensor 602 is shown in FIG. 6. The sensor 602 may be an on-chip sensor and may provide an on-chip temperature measurement of the chip (as an example of an electronic circuit of the electronic device 200, 400). The respectively current temperature that has been measured by the sensor 602 is supplied as a temperature signal 604 to a noise filtering circuit 606, in this example implemented as an FIR filter circuit 606.

Illustratively, the optional additional filtering of sensor measurements may be provided to reduce measurement noise and/or determine a slope of temperature change.

Measurement noise may be reduced by having a short measurement interval of e.g. 100 ms over 5 to 10 observation points N. This may be realized by using an N-tap FIR filter circuit 606. The FIR filtered signals 610 (which may already indicate a temperature severity) may be provided to an additional filter circuit 608. Thus, on a 2nd level of filtering, timely distant averaged measurements may be used to determine the slope of temperature change. This may be accomplished via an IIR filter circuit 608, which is coupled downstream to the FIR filter circuit 606. The IIR filter circuit 608 may provide IIR filtered signals 612, which may indicate a temperature rise. Further, the averaged value (i.e. the FIR filtered signals 610) may serve to determine a current temperature severity level. The slope or equivalently the temperature change over time may be used as a weight in selecting the throttling action as will be described in more detail below (symbolized in FIG. 6 by block 614).

Reference is now made it again to FIG. 5, which additionally illustrates a block 514 symbolizing a catalog of various data, power and algorithmic throttling schemes for the electronic circuits, which may be selected dependent on the thermal resistance matrix $R_{TH}$ and for example is the measured temperature data. It is to be noted, that it is not absolutely necessary to measure the temperature of the electronic circuits, it may for example be sufficient to measure the temperature of the environment of the electronic device and estimate the temperature of the various electronic circuits based on the temperature of the environment. The above-mentioned catalog may include or take into account the capabilities 516 of the respective electronic circuits (e.g. the modem RAT capabilities) and/or various possible power reduction schemes 518 which may be used for the respective electronic circuits.

As will be described in more detail below, the application of a prioritized multi-level data, power and algorithm throttling control loop may address each temperature scenario adequately. To do this, in various aspects of this disclosure, and optional classification of the individual throttling approaches based on their impact to data throughput and potentials in power reduction is provided. Just as a simple example, 8 power throttling levels as outlined in table 5 may be provided for classification. Furthermore, multiple throttling approaches may be assigned to every individual level to mitigate the thermal problem with least possible impact to user experience.

TABLE 5

Definition of throttling steps

| Throttling step | Throttling level |
|---|---|
| 0 | No throttling |
| 1 | Slight throttling A |
| 2 | Slight throttling B |
| 3 | Medium throttling |
| 4 | Severe throttling A |
| 5 | Severe throttling B |
| 6 | Aggressive throttling A |
| 7 | Aggressive throttling B |

Each throttling step may contribute to a power reduction of different magnitude of the electronic circuits and may include earlier activated throttling steps of lower levels. This means with more throttling steps enabled, more energy consumption may be reduced. This may translate to a stronger temperature cooling effect at the cost of increased impact to data throughput.

In the following various methods are derived that can reduce power consumption in a wireless electronic device and map it to a throttling level.

However, this disclosure will give provide an exemplary classification of the various throttling methods. Depending on the characteristics of the considered electronic device such as e.g. on the modem SoC design, device-capabilities, intended product type and product environment (e.g. datastick, wearable, smartphone or tablet), the classification may change. This may require a tailored optimization to the given target environment. Whereas the same method can be applied.

In our example setup, a prioritization may be provided in the following order:
1. Device overheating
    avoid software crash and/or hardware damage;
2. Seamless connectivity
    maintain voice calls;
3. Device skin temperature
    maintain convenient back skin temperature
4. Downlink throughput rate
5. Uplink throughput to rate In a different setup, the device skin temperature can may be prioritized lower, when it is not intended to be a handheld or wearable but rather a machine-to-machine product. In general, the prioritization, the definition of the respective throttling methods (in other words throttling mechanisms) and the classification may vary depending on the electronic device and the electronic circuits contained in the electronic device.

However, it should be noted that the mechanisms in this disclosure are dynamic and applicable to many heating scenarios and can e.g. be used in the UE independently of support in the communication network.

Throttle Mechanism 1: MAX TX Power Backoff

Figure 7:
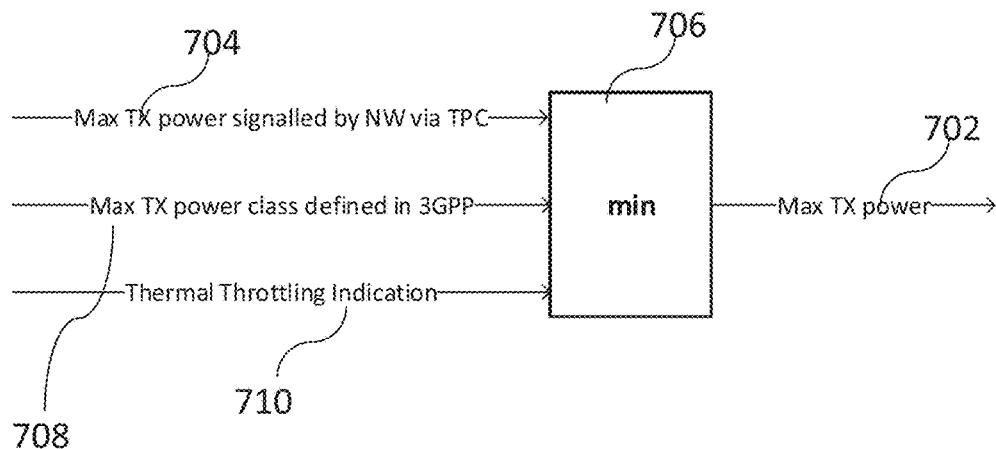
FIG. 7 shows a block diagram illustrating the determination of the maximum transmit power for a mobile radio communication terminal device.

FIG. 7 shows a block diagram 700 illustrating the determination of the maximum transmit power for a mobile radio communication terminal device such as UE 102. One possibility to resolve thermally critical condition is reducing the maximum transmit power level 702 in the mobile radio communication terminal device such as UE 102. In 3G and 4G, for example, the maximum output power for any transmission bandwidth is specified as 23 dBm. The network signals to the mobile radio communication terminal device such as for example the UE 102 via e.g. so-called TPC commands 704 a specific power level, up to the limit of 23 dBm. A considerable amount of current can be saved, by taking a back off from the nominal max transceiver power. The max transmit power level can be reduced e.g. in steps of 1 dBm.

Therefore, one throttling mechanism can be seen in determining the maximum transmit power level 702 by a processor 706 based on for example taking into account received TPC commands 704 and/or a received maximum transmit power class 708 as it is defined for example in 3GPP and/or a thermal throttling indication 710 which will be described in more detail below.

This maximum transmit power limitation may give an average power scale down in the PA circuit 404 transmitter components which will translate in temperature cooling over time. The drawback in the case of a transmit power limitation will be especially in the presence of high path loss. A higher rate of UL (uplink) retransmissions due to weaker CINR (Carrier-to-Interference-and-Noise Ratio) perceived at the eNodeB may occur.

A throttling mechanism including the following throttling steps for maximum transceiver power limitation as shown in table 6 may be provided for the PA circuit 404.

TABLE 6

Throttling steps for maximum transmit power limitation

| | Maximum transmit power limitation |
|---|---|
| Slight throttling A | 22 dBm |
| Slight throttling B | 21 dBm |
| Medium throttling | 20 dBm |

The communication network can switch to a more robust modulation and coding scheme in the UL to improve the retransmission rate, which in turn may also reduce the UL data rate and thus lower UL data processing load in the UE. This may result in an additional power reduction.

Throttle Mechanism 2: Reduce UL Data Rate

For transmitting data to the communication network, the UE may request UL transmission resources by the base station, for example the eNodeB. Since the radio resource is shared among all users, the eNodeB may control the distribution of the radio bearers. If eNodeB provides an UL Grant, then UE can send UL data as allowed by the UL Grant. In this way the UL data rate is dictated by the eNodeB. In temperature restrictive scenarios, our goal is to throttle UL data transmission to reduce processing load and thus power consumption to counteract device heating.

By way of example, there are two options, how to reduce UL data transmission rate.

- By not using all scheduled UL resources for data transmission, but rather appending padding bits, the UE can reduce its data processing load (e.g. less data encoding required) and influence the network scheduling. The eNodeB will recognize the padding bits upon which it will reduce the UL transmission resources assigned to the UE. Depending on the individual eNodeB algorithm, the drop in data rate might be very drastic. The usage of padding bits comes also with the cost of making inefficient use of the network cellular link resources.
- An even more efficient approach is to modify the Buffer Status Report (BSR), which indicates to the network the amount of data to be transmitted. Asking the eNodeB to drop UL data rate, can be accomplished by forcing a lower BSR, e.g. decreasing artificially buffer sizes used for BSR. In this way usage of padding bits which consume expensive UL resources may be omitted. Further, it may be a target to cut the UL data rate by a specific rate like ½, by reducing the BSR accordingly.

A throttling mechanism including the following throttling steps for UL data rate reduction as shown in table 7 may be provided for the modem CPU 412, 2G RAT circuit 414, 3G RAT circuit 416, 4G RAT circuit 418, RF circuit 406, and PA circuit 404.

TABLE 7

Throttling steps for UL data rate reduction

| | Decrease buffer size by |
|---|---|
| Slight throttling A | ½ |
| Slight throttling B | ⅓ |

A lower UL data rate will reduce the processing on the whole UL data chain, from CPU (e.g. modem CPU 412) to TRX (e.g. RF circuit 406) and reduce the average UL TX power amplification in the PA (e.g. PA circuit 404).

Throttle Mechanism 3: Reduce UE Receiver Decoding Iterations

UE may use forward error correction (FEC) schemes to achieve better transmission performance. The more demanding part of FEC, in terms of computation complexity, is e.g. the iterative (turbo) decoding in the receive chain. A typical turbo decoder (implemented in accordance with 3G & 4G) may consist of two maximum a posteriori (MAP) decoders separated by an interleaver that permutes the input sequence. The decoding is an iterative process in which the so-called extrinsic information is exchanged between the MAP decoders. Each turbo iteration is divided into two half iterations. At first half iterations, a first MAP decoder may be enabled. At second half iteration, a second MAP decoder may be enabled.

This iterative process may be repeated until the decoding has converged or the maximum number of iterations has been reached. Typically the maximum number of half iterations is 32. Since this process is computation intensive and typically contributes to an essential part of power consumption within the 3G&4G digital baseband circuit, the maximum number of iterations or half iterations may be limited in case of heat issues emerge.

The reduction of the iteration steps may have an immediate positive impact on the UE power consumption. The drawback will be on degraded error correction capabilities. A lower rate of correctly decoded data blocks may occur, which may result in more packet retransmissions. This may result in overall lower data throughput, which gives further contribution in power saving e.g. in the modem CPU 412. The eNodeB will react on the higher rate of not acknowledged (NACK) data blocks by switching to a more robust transmission scheme (e.g. more usage of redundant bits and more reliable modulation) which may result in lower data rate and improvement of the block error rate of the decoder.

It may be provided to limit the maximum number of half iterations in two levels as in the following table 8 (this throttling mechanism may be provided for the modem CPU 412):

TABLE 8

Throttling steps for decoder iteration limitation

| | Maximum number of half iterations |
|---|---|
| Medium throttling | 4 |
| Severe throttling A | 2 |

Throttle Mechanism 4: Force Packet Retransmissions

The modem CPU 412 may have no direct control over the amount of downlink data scheduled by the eNodeB. The employed HARQ (hybrid automatic repeat request) process may require for every received downlink (DL) transport block a feedback in the form of an ACK or NACK acknowledgment.

In thermal heating scenarios, the current consumption may need to be dropped by creating artificially power down time slots. The UE may pretend to have a bad downlink reception by sending back a NACK to the eNodeB, even for correctly decoded transport blocks. In this way, the downlink data throughput may be throttled and average power consumption may be reduced. The HARQ process allows up to e.g. 4 (re)transmissions of the same data packet by using different redundancy versions.

It may be provided to steer the throttling rate by utilizing all HARQ redundancy versions, for e.g. every 2nd transport block.

A throttling mechanism including the following throttling steps for forcing packet retransmissions as shown in table 9 may be provided for the modem CPU 412, 2G RAT circuit 414, 3G RAT circuit 416, 4G RAT circuit 418, RF circuit 406, and PA circuit 404.

TABLE 9

Throttling steps for utilization of HARQ process

| | Artificial NACKs on transport block rate |
|---|---|
| Medium throttling | Every third transport block |
| Severe throttling A | Every second transport block |
| Severe throttling B | Every transport block |

The artificially induced retransmission periods may add further slots where e.g. the CPU (e.g. the modem CPU 412) can switch to sleep mode.

Throttle Mechanism 5: Single Antenna Operation

In 4G, the default number of receiver antennas is specified as 2. In single layer transmission, it serves to improve SINR (signal to interference and noise ratio) through diversity gain provided by the two reception paths. Signal condition is hereby improved by 3 dB, as the same data stream is received over two antennas. In a scenario with good signal condition, e.g. strong RSRP and low Doppler spread, a switch to single receive antenna will effect block error rates minimally. Thus, the electronic device will maintain throughput rate and in parallel reduce power consumption considerably both in TRX and 4G PHY. The electronic device utilizes this in an early stage of temperature rise, by setting threshold on RSRP and Doppler spread for detection of good signal condition. In medium critical scenarios, we lower the thresholds, allowing impact on data rate. In highly critical scenarios we disable the diversity antenna independent of the signal conditions.

A throttling mechanism including the following throttling steps for forcing packet retransmissions as shown in table 10 may be provided for the modem CPU 412, 4G RAT circuit 418 and RF circuit 406.

TABLE 10 throttling steps for disabling diversity antenna

| | Disable diversity RX antenna |
|---|---|
| Slight throttling A | Good signal conditions (RSRP > −80 dBm && Doppler < 50 Hz) |
| Medium throttling | Medium signal conditions (RSRP > −85 dBm && Doppler < 1000 Hz) |
| Severe throttling B | Independent of signal conditions |

Multiple spatial layers, with independent data streams, are not targeted by this thermal action.

Throttle Mechanism 6: Simplified Algorithms

A conventional 3G and 4G device is usually equipped with advanced interference mitigation algorithms to improve data reception, especially in mobile radio cell-edge scenarios where a higher interference level from neighboring eNodeBs can be expected. Hereby, the mitigation algorithms can be roughly classified into interference scaling and interference cancellation. Scaling traditionally applies on all interferers and requires less computation power. The interference suppression is however not satisfying in many scenarios. Thus more complex algorithms exist, that perform a channel estimation of the interferer followed by subtraction from the received signal. Advanced rejection algorithms include also iterative interference cancellation processes. The complexity of these algorithms scale with the number of interferers to be cancelled. Current standardization releases propose the handling of 2 dominant interferers. From a thermal mitigation point of view, it may be provided to classify the interference handling in terms of computation load, and disable the advanced algorithms in thermal mitigation process as shown in table 11.

A throttling mechanism including the following throttling steps for simplified algorithms as shown in table 11 may be provided for the 3G RAT circuit 416 and 4G RAT circuit 418.

TABLE 11 throttling steps for reducing interference mitigation feature

| | Modify interference handling |
|---|---|
| Slight throttling B | Limit advanced interference algorithms to treat one dominant interferer only |
| Severe throttling A | Allow only simple interference scaling |
| Aggressive throttling A | Disable all interference mitigation |

The benefit will be seen mainly on the PHY Layers of 4G and 3G RATs, via reduced computation time and memory usage. In this aspect, CPU sleep times and memory retention phases will be extended to counteract temperature rises.

Especially the aggressive throttling processes omit usage of advanced modem capabilities. But it may only be targeted at emergency situations like overheating of the device, which otherwise would end in a thermal run-away. Here a complete modem shut down (Flight Mode) by the thermal control might be applied.

Throttle Mechanism 7: Force Connection Drop on Additive Component Carriers

Current 3GPP releases specify up to 5 Component Carriers (CC), each with a maximum bandwidth of 20 MHz. In thermal critical scenarios, it may be provided to reduce the number of component carriers to significantly limit power consumption. A reduction of CCs may show a power relaxation in all modem SoC modules. Since the eNodeB controls the activation/deactivation of additive CCs, the UE can pretend to measure inacceptable channel conditions. This can be accomplished by modifying the measurement reports on selective CCs and indicating that signal strength (RSRP) is below acceptable cell reception level. Accordingly, the CQI reports and ACK/NACK feedback should be adapted.

A throttling mechanism including the following throttling steps for forcing connection on additive component carriers as shown in table 12 may be provided for the PMIC circuit 420.

TABLE 12

Throttling steps on carrier aggregation

| | Modifying number of additive CCs |
|---|---|
| Severe throttling A | Limit CA to 1 additive CC |
| Severe throttling B | Limit to non-CA |

As this is a pretty aggressive throttling scheme, it may be provided to employ it only in thermal critical scenarios.

Since LTE voice calls (VoLTE), are employed on the non-additive carrier, namely primary carrier, we will not disrupt an ongoing call.

Throttle Mechanism 8: Reduce UE Capabilities

In a critical overheating scenario the UE cannot wait till eNodeB reacts on feedback signaling and lowers the throughput. In such a case, the UE may need to trigger throttling actions that apply fast and reduce power consumption in high magnitude. In such scenarios, it may be provided to cut throughput along with limiting e.g. carrier aggregation, maximum data rate and MIMO capabilities.

During the UE attach procedure, the UE reports detailed capability information to the eNodeB. Facing critical overheating issues, the UE can limit its own radio access capabilities with regards to supported UE category and radio access technology.

A throttling mechanism including the following throttling steps for reducing UE capabilities as shown in table 13 may be provided for the modem CPU 412.

TABLE 13

Throttling steps for reducing UE capabilities

| | Modify UE capabilities |
|---|---|
| Aggressive throttling A | Limited to 3G/4G legacy operation |
| Aggressive throttling B | Drop to 2G RAT only |

It is to be noted that 3GPP category-3 for 4G and category-14 as 3G legacy operation without carrier aggregation capability may be provided.

As these thermal steps will be triggered only in high severity cases by an immediate need of maximizing device cooling, it may be provided to drop an ongoing call to force a UE detach and start a (re)registration in the communication network with setting the limited capabilities.

Throttle Mechanism 9: Power Subdomain for Legacy Operation

Recent mobile application processors are designed so that its multi-core high frequency CPUs are power gated in case of less demanding tasks which are processed by a companion core to reduce overall power consumption. In parallel to this architecture, the modem SoC can be designed so that additional power subdomains are created that cover only the basis logic domain and memory regions that are required to process the legacy use cases. As legacy use case the following are regarded, full 2G, 3G category-14 and 4G category-3. The modem SoC is designed to embed memory and processing capabilities tailored for peak data transmission rate that will be rarely utilized in a real network environment. This may offer an important possibility to boost the temperature recovery effect i.e. when we thermally limit to the legacy use case only. This means, as soon as the thermal scheme enables the aggressive throttling step, an immediate power gate may be provided so that only legacy related resources are active. It is to be foreseen that memory regions are split up to multiple banks. Hereby internal memories (data and instruction) of microcontrollers/DSPs and common on-chip data buffers need selective power switches to match legacy use case needs. The firmware code should be compiled selectively for the advanced features and reload from external memory when aggressive throttling is disabled.

As described above in detail, various throttling mechanisms may be individually or group-wise assigned to respectively one or more electronic circuits of the electronic device. The throttling mechanisms may furthermore be assigned to throttling classes, wherein different throttling mechanisms of respective electronic circuits may be assigned to the same or different throttling classes. By way of example, if a processor of the electronic device determines a throttling class and activates the same, it will inform or instruct the respective electronic circuits of the electronic device which has implemented a throttling scheme in accordance with the activated throttling class. The one or more electronic circuits which have respectively implemented a throttling scheme in accordance with the activated throttling class will then carry out the respective throttling mechanism assigned to the activated throttling class. However, as an alternative, also local activation of throttling mechanisms individually by the electronic circuit itself or by a processor controlling a plurality of electronic circuits with respect to their respective throttling schemes may be provided.

After having described various examples of possible throttling schemes for reducing power consumption in the electronic circuits of the electronic device, a possible implementation of determining and selecting the throttling schemes of the electronic circuits will be described in more detail. In general, an example is described for setting up the temperature control algorithm for the electronic device (e.g. electronic device 200, 400).

To balance on perceived user experience between seamless data reception, average data throughput and device back-skin temperature, the electronic device may apply selectively throttling steps by using the filtered results, for example the filtered signals 520 provided by the filtering circuit 512 (cf. FIG. 5).

By reaching a high temperature severity level, or detecting a fast temperature rise even on non-critical heat regions, the processor may prioritize on throttling methods with high potential on power save. Even if this means a strong impact on average throughput or interrupting seamless data reception. Vice versa the processor may gradually increase power throttling steps in a moderate heating scenario e.g. less than +1° C. per second.

Referring again back to FIG. 5, a block 522 symbolizes the storing and selecting of throttling mechanisms, e.g. via throttling classes. This functionality may be implemented by the processor, in general by any processor of an electronic circuit in the electronic device. The processor carries out this selection using the received filtered signals 520 as well as the stored thermal resistance matrix $R_{TH}$ and the stored catalog of data, power and algorithmic throttling mechanisms, which will be described in more detail below.

The following table 14 illustrates the approach carried out by the processor. The processor may determine and store a look-up-table which scales the throttling steps of table 5, based on temperature severity level and slope.

TABLE 14

Look up Table for thermal control algorithm

| | | Temperature Slope | | | |
|---|---|---|---|---|---|
| | $\overline{X}$ | w = 0 | w = 1 | w = 2 | w = 3 |
| Heat Severity | 60° C. | 0 | 1 | 2 | 3 |
| | 70° C. | 1 | 2 | 3 | 4 |
| | 80° C. | 2 | 3 | 4 | 5 |
| | 90° C. | 3 | 4 | 5 | 6 |
| | 100° C. | 7 | 8 | 8 | 8 |

The temperature slope w is normalized to temperature changes on a second basis as follows:

TABLE 15

Translation of temperature change to slope w

| w | Temperature (t) change per second |
|---|---|
| 0 | $0 < t \leq 1.5$ |
| 1 | $1.5 < t \leq 3$ |
| 2 | $3 < t \leq 4$ |
| 3 | $t > 4$ |

The characterization on temperature change per time is subject to individual optimization depending on the particular device physics. The above table 15 illustrates a sample guideline for the example given above.

Enhancing device cooling will be achieved by utilizing the cross-term elements of the stored thermal resistance matrix $R_{TH}$. In this way, the processor may enhance the, optionally step-wise, throttling scheme, e.g. by reducing cross component heating in parallel to the localized throttling.

This means, the throttling scheme may be a function of temperature severity, temperature slope and thermal resistance value (determined from the stored thermal resistance matrix $R_{TH}$).

ThrottlingScheme($\overline{x}$,w,$R_{TH}$)

The throttling scheme which the processor selects and applies may be a combination of multiple throttling methods across one or more electronic circuits (e.g. one or more chip modules) of the electronic device. Temperature severity and slope may determine throttling level on a specific electronic device (e.g. chip module) where the heat issue is detected. The processor, using the chip thermal resistance matrix $R_{TH}$, may select which of the other electronic circuits (e.g. electronic components) will be included in the throttling scheme. The processor may filter out external components that do not have a remarkable contribution to the ongoing heating which either is due the respective physical characteristic or chip placement. This information is contained in the stored thermal resistance matrix $R_{TH}$. Filtering can be achieved by a simple threshold crossing. In this fashion, component cooling may be assisted via reduced cross-component heating.

When the filtered temperature (indicated e.g. by the filtered signals 520) of a particular electronic circuit (e.g. chip-module) exceeds a certain level, the processor may use table 13 along with the IIR filter output of e.g. the filtering circuit 512 to enable the corresponding throttling step of this respective electronic circuit (e.g. chip module).

Figure 8:
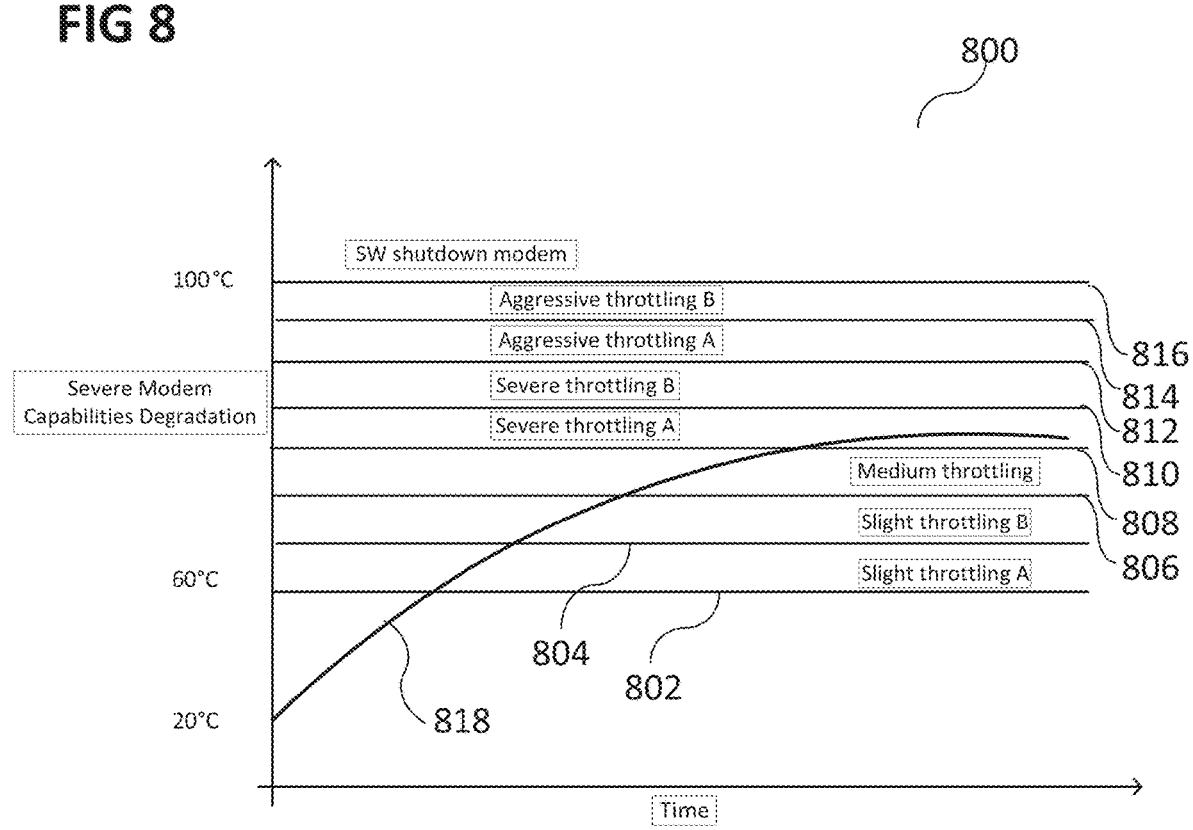
FIG. 8 shows a diagram illustrating the selection of throttling classes depending on a determined temperature of at least a portion of an electronic device.

FIG. 8 shows a diagram 800 illustrating the selection of throttling classes (as described with reference to table 5 above) depending on a determined temperature of at least a portion of an electronic device over the time. This selection process in accordance with FIG. 8 assumes a moderate heating scenario of the electronic device. In other words, the processor carries out the selection process as illustrated in FIG. 8, where a moderate temperature rise triggers respective throttling steps to counteract the moderate heating of the electronic device.

In more detail, a first temperature threshold 802 is provided. As long as the temperature remains below the first temperature threshold 802, the electronic device and its electronic circuits carry out their respective functions without any throttling.

In case the temperature exceeds the first temperature threshold 802, the processor may activate the throttling class (and thereby the associated throttling mechanisms provided in the respective electronic circuits of the electronic device, e.g. in accordance with the tables outlined above) "Slight throttling A". The processor may remain the throttling mechanisms of this throttling class as long as the temperature remains above the first temperature threshold 802 but below a second temperature threshold 804, which is higher than the first temperature threshold 802.

In case the temperature exceeds the second temperature threshold 804, the processor may activate the throttling class (and thereby the associated throttling mechanisms provided in the respective electronic circuits of the electronic device, e.g. in accordance with the tables outlined above) "Slight throttling B". The processor may remain the throttling mechanisms of this throttling class as long as the temperature remains above the second temperature threshold 804 but below a third temperature threshold 806, which is higher than the second temperature threshold 804.

In case the temperature exceeds the third temperature threshold 806, the processor may activate the throttling class (and thereby the associated throttling mechanisms provided in the respective electronic circuits of the electronic device, e.g. in accordance with the tables outlined above) "Medium throttling". The processor may remain the throttling mechanisms of this throttling class as long as the temperature remains above the third temperature threshold 806 but below a fourth temperature threshold 808, which is higher than the third temperature threshold 806.

In case the temperature exceeds the fourth temperature threshold 808, the processor may activate the throttling class (and thereby the associated throttling mechanisms provided in the respective electronic circuits of the electronic device, e.g. in accordance with the tables outlined above) "Severe throttling A". The processor may remain the throttling mechanisms of this throttling class as long as the temperature remains above the fourth temperature threshold 808 but below a fifth temperature threshold 810, which is higher than the fourth temperature threshold 808.

In case the temperature exceeds the fifth temperature threshold 810, the processor may activate the throttling class (and thereby the associated throttling mechanisms provided in the respective electronic circuits of the electronic device, e.g. in accordance with the tables outlined above) "Severe throttling B". The processor may remain the throttling mechanisms of this throttling class as long as the temperature remains above the fifth temperature threshold 810 but below a sixth temperature threshold 812, which is higher than the fifth temperature threshold 810. This operation mode may already result in a severe (e.g. modem) capabilities degradation of the electronic device.

In case the temperature exceeds the sixth temperature threshold 812, the processor may activate the throttling class (and thereby the associated throttling mechanisms provided in the respective electronic circuits of the electronic device, e.g. in accordance with the tables outlined above) "Aggressive throttling A". The processor may remain the throttling mechanisms of this throttling class as long as the temperature remains above the sixth temperature threshold 812 but below a seventh temperature threshold 814, which is higher than the sixth temperature threshold 812.

In case the temperature exceeds the seventh temperature threshold 814, the processor may activate the throttling class (and thereby the associated throttling mechanisms provided in the respective electronic circuits of the electronic device, e.g. in accordance with the tables outlined above) "Aggressive throttling B". The processor may remain the throttling mechanisms of this throttling class as long as the temperature remains above the seventh temperature threshold 814 but below an eighth temperature threshold 816, which is higher than the seventh temperature threshold 814.

In case the temperature exceeds the eighth temperature threshold 816, the processor may shut down the electronic device, partially or completely, that is the processor may shut down all electronic circuits of the electronic device or only some of the electronic circuits.

The deactivation process of the throttling classes is similar to the activation process of the respective throttling classes and the associated throttling mechanisms. In other words, the processor deactivates the respective throttling classes and activates the respective lower throttling class in case a respective temperature threshold 802, 804, 806, 808, 810, 812, 814, 816, in case the respective lower temperature threshold of the associated throttling class is underrun.

FIG. 8 further shows a first temperature control characteristic 818. The processor controls the electronic circuits with respect to the throttling mechanisms in accordance with this first temperature control characteristic 818 in case of a moderate temperature rise within the electronic device.

In a fast heating scenario (e.g. device exposed to sunlight), the processor may adapt the selection of the throttling schemes for the respective electronic circuits to react more aggressively.

Figure 9:
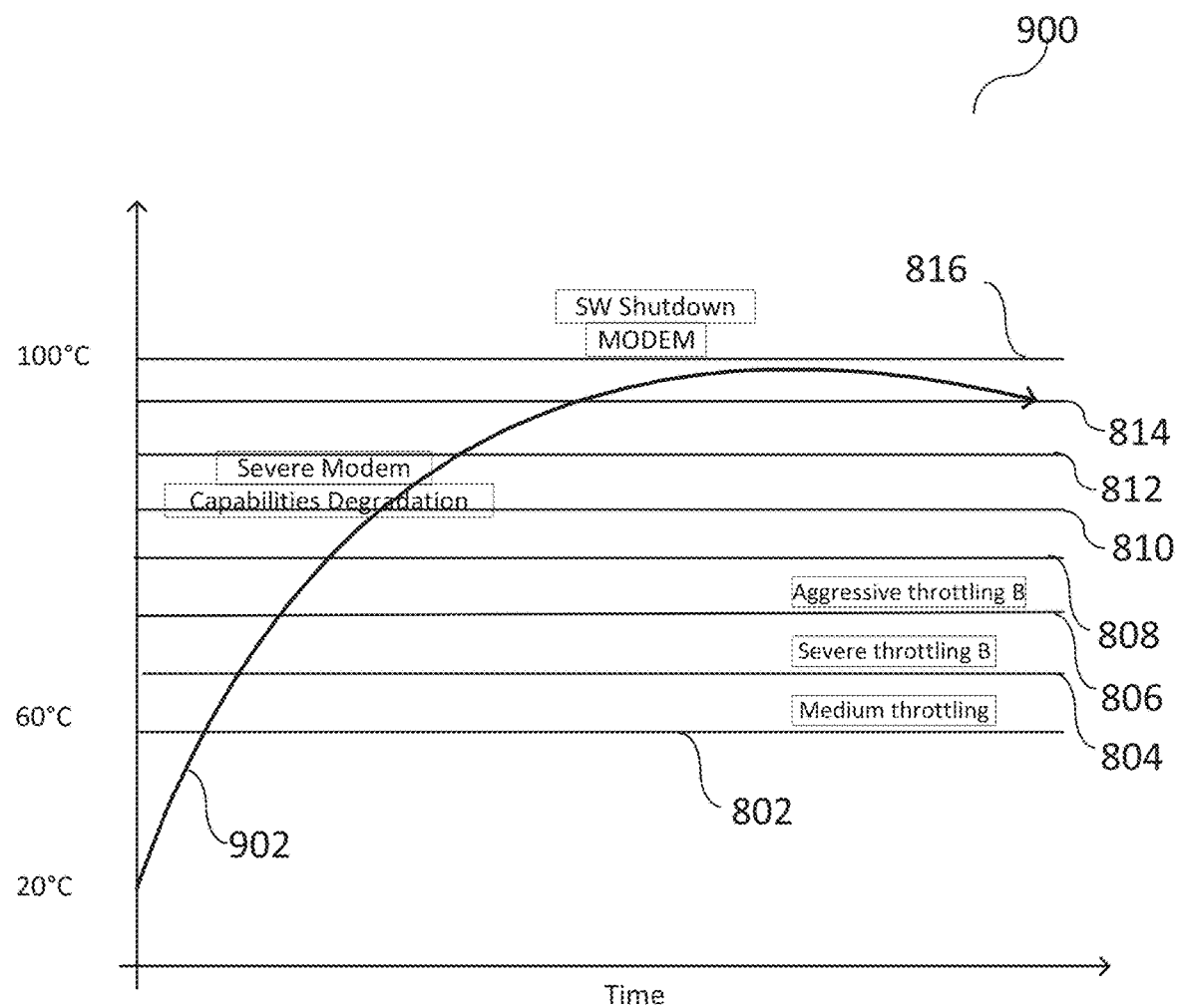
FIG. 9 shows a diagram illustrating the selection of throttling classes depending on a determined temperature of at least a portion of an electronic device.

FIG. 9 shows a diagram 900 illustrating the selection of throttling classes (as described with reference to table 5 above) depending on a determined temperature of at least a portion of an electronic device over the time. This selection process in accordance with FIG. 9 assumes a fast heating scenario of the electronic device. In other words, the processor carries out the selection process as illustrated in FIG. 9, where a fast temperature rise triggers respective throttling steps to counteract the fast heating of the electronic device.

In this example, some throttling classes as described with reference to table 5 may be skipped.

In more detail, the first temperature threshold 802 is provided also in this case. As long as the temperature remains below the first temperature threshold 802, the electronic device and its electronic circuits carry out their respective functions without any throttling.

In case the temperature exceeds the first temperature threshold 802, the processor may activate the throttling class (and thereby the associated throttling mechanisms provided in the respective electronic circuits of the electronic device, e.g. in accordance with the tables outlined above) "Medium throttling", thereby skipping the throttling classes "Slight throttling A" and "Slight throttling B". The processor may remain the throttling mechanisms of this throttling class as long as the temperature remains above the first temperature threshold 802 but below the second temperature threshold 804, which is higher than the first temperature threshold 802.

In case the temperature exceeds the second temperature threshold 804, the processor may activate the throttling class (and thereby the associated throttling mechanisms provided in the respective electronic circuits of the electronic device, e.g. in accordance with the tables outlined above) "Severe throttling B", thereby further skipping the throttling class "Severe throttling B". The processor may remain the throttling mechanisms of this throttling class as long as the temperature remains above the second temperature the threshold 804 but below a third temperature threshold 806, which is higher than the second temperature threshold 804.

In case the temperature exceeds the third temperature threshold 806, the processor may activate the throttling class (and thereby the associated throttling mechanisms provided in the respective electronic circuits of the electronic device, e.g. in accordance with the tables outlined above) "Aggressive throttling B", thereby further skipping the throttling class "Aggressive throttling A". The processor may remain the throttling mechanisms of this throttling class as long as the temperature remains above the third temperature threshold 806 but below eighth temperature threshold 816, which is higher than the third temperature threshold 806.

In case the temperature exceeds the eighth temperature threshold 816, the processor may shut down the electronic device, partially or completely, that is the processor may shut down all electronic circuits of the electronic device or only some of the electronic circuits.

The deactivation process of the throttling classes is similar to the activation process of the respective throttling classes and the associated throttling mechanisms. In other words, the processor deactivates the respective throttling classes and activates the respective lower throttling class in case a respective temperature threshold 802, 804, 806, 808, 810, 812, 814, 816, in case the respective lower temperature threshold of the associated throttling class is underrun.

FIG. 9 further shows a second temperature control characteristic 902. The processor controls the electronic circuits with respect to the throttling mechanisms in accordance with this second temperature control characteristic 902 in case of a fast temperature rise within the electronic device.

This is illustrated in FIG. 9 by the second temperature control characteristic 902 being steeper than the first temperature control characteristic 818.

In this fashion, the processor provides an automatic adaptation of the throttling scheme.

Thus, illustratively, the temperature slope as well as the absolute temperature of the electronic device may be taken into consideration in the selection of the throttling classes.

Additionally, the processor may evaluate the cross-terms of the thermal resistance matrix $R_{TH}$ to determine neighboring electronic circuits (e.g. chip modules) that contribute substantially to the detected heating. Main heat contributors across external chips can be easily determined by evaluating respective entries of the thermal resistance matrix $R_{TH}$ that exceed a certain level, e.g. 19 K/W or where the thermal impact of the respective entries of the thermal resistance matrix $R_{TH}$ multiplied with the power of the respective external chip exceeds a certain level e.g. 5K. The latter may be a measure for the temperature increase induced by the respective external chips.

The processor may select the thermal mitigation scheme, e.g. the thermal mitigation scheme "Slight Throttling A" based on sensor data on the DBB circuit 408. The processor may apply localized throttling methods that are applicable for the DBB circuit 408 and in addition trigger neighboring chips to throttle, based on their cross-heating contribution.

The throttling scheme may reduce target electronic circuit (e.g. chip module) internal heating and considerable heating induced by one or more electronic circuits (e.g. one or more chip modules) surrounding to effectively counteract the detected temperature rise.

The thermal algorithm will consider temperature severity, temperature slope and thermal resistance to achieve an optimum balance between user experience and device heating.

Straightforwardly, the same procedure can be applied on DBB subsystem level with on-die sensors monitoring temperature of 4G-RAT circuit 418, 3G-RAT circuit 416 and modem CPU 412, for example.

Furthermore, in some aspects of this disclosure, the processor may achieve temperature reduction upon our individual throttling, and may not use the same threshold level for deactivating the corresponding throttling step. The processor may in this case rather apply a hysteresis (symbolized in FIG. 5 by block 524) before disabling this throttling. The processor may implement the hysteresis such that it is the half of the temperature distance between the neighboring levels. In this example, the processor may apply a hysteresis band 1002 of 5° C. (for example between 75° C. and 80° C.) as symbolized in a diagram 1000 in FIG. 10, which illustrates the hysteresis for throttling deactivation. Furthermore, FIG. 10 illustrates an exemplary temperature characteristic 1004 and a crossing point 1006 of the temperature characteristic 1004 with a 75° C. threshold 1008.

This means, a throttling step that the processor may have been enabled with the temperature characteristic 1004 crossing an 80° C. threshold 1010, will not be deactivated by crossing back this level but rather when having achieved a cooling by the hysteresis length.

Thus, the processor may deactivate the throttling mechanisms and thus may e.g. "go down" the throttling classes in accordance with the following rule:

Disabling-Temperature-Level=Enabling-Temperature-Level−Hysteresis

The application of the hysteresis may reduce the frequency of deactivation/activation of the same throttling step and may make sure to have cooled down the temperature by a certain amount.

The respective throttling mechanism (which may also be referred to as device cooling measures) are illustrated in FIG. 5 by a block 526.

As mentioned above, the processor may be any logic included in the electronic device, for example and a processor of any electronic circuit, such as for example the modem CPU 412 or by way of example, also an application processor of the electronic device.

In one aspect, the processor may throttle the first electronic circuit if it gets too hot, wherein the processor may be part of the first electronic circuit. However, as an alternative, the processor may be configured to throttle another electronic circuit instead of the first electronic circuit in case the first electronic circuit gets too hot. In other words the processor may be configured to throttle a second circuit depending on temperature of a first circuit and the thermal interdependency between the first circuit and the second circuit.

As described above, the processor may also be configured to select a respective throttling scheme taking into consideration how "undesirable" the activation of the respective throttling scheme or plurality of throttling schemes would impact the user experience to find the scheme (or set of schemes if a single one is not sufficient) that gives the least user experience impact (while still achieving the required or desired cooling).

Example 1 is an electronic device. The electronic device may include a plurality of electronic circuits including a first electronic circuit and a second electronic circuit, and a processor configured to control at least one of the first electronic circuit or the second electronic circuit depending on at least one parameter indicating thermal properties of the first electronic circuit and a predetermined parameter indicating a thermal interdependency between the first electronic circuit and the second electronic circuit.

In Example 2, the subject matter of Example 1 may optionally include that the processor is further configured to control at least one of the first electronic circuit or the second electronic circuit depending on at least one parameter indicating thermal properties of the second electronic circuit.

In Example 3, the subject matter of any one of Examples 1 or 2 may optionally include that the first electronic circuit includes the processor.

In Example 4, the subject matter of any one of Examples 1 to 3 may optionally include that the electronic device further includes at least one temperature sensor to measure the temperature of at least a portion of at least one of the first electronic circuit or the second electronic circuit.

In Example 5, the subject matter of any one of Examples 1 to 4 may optionally include that the processor is configured to control the second electronic circuit depending on at least one parameter indicating thermal properties of the first electronic circuit.

In Example 6, the subject matter of any one of Examples 1 to 4 may optionally include that the processor is configured to control the first electronic circuit to vary the performance of the first electronic circuit.

In Example 7, the subject matter of any one of Examples 1 to 6 may optionally include that the electronic device further includes a memory configured to store information about thermal properties of the first electronic circuit, thermal properties of the second electronic circuit and thermal interdependency between the first electronic circuit and the second electronic circuit.

In Example 8, the subject matter of Example 7 may optionally include that the memory is configured to store information about thermal properties of each electronic circuit of the plurality of electronic circuits.

In Example 9, the subject matter of any one of Examples 7 or 8 may optionally include that the memory is configured to store information about thermal interdependencies between all the electronic circuits of the plurality of electronic circuits.

In Example 10, the subject matter of any one of Examples 7 to 9 may optionally include that the memory is further configured to store, for at least the first electronic circuit, an electronic circuit throttling scheme including instructions to change the functionality of the first electronic circuit, to thereby change the power consumption of the first electronic circuit.

In Example 11, the subject matter of Example 10 may optionally include that the memory is further configured to store, for each electronic circuit of the plurality of electronic circuits, a respective electronic circuit throttling scheme including instructions to change the functionality of the respective electronic circuit, to thereby change the power consumption of the respective electronic circuit.

In Example 12, the subject matter of Example 11 may optionally include that the memory is configured to store information about thermal properties of each electronic circuit of the plurality of electronic circuits, wherein the memory is configured to store information about thermal interdependencies between all the electronic circuits of the plurality of electronic circuits, wherein the processor is further configured to determine a temperature of at least a part of the electronic device, to determine a cooling scheme based on the stored information about thermal properties of each electronic circuit of the plurality of electronic circuits, the stored information about thermal interdependencies between all the electronic circuits of the plurality of electronic circuits, and the stored plurality of electronic circuit throttling schemes, and to control at least the first electronic circuit in accordance with the determined cooling scheme based on the determined temperature of at least a part of the electronic device.

In Example 13, the subject matter of any one of Examples 1 to 12 may optionally include that the plurality of electronic circuits includes a third electronic circuit, wherein the processor is further configured to control the first electronic circuit depending on a parameter indicating a thermal interdependency between the first electronic circuit and the third electronic circuit.

In Example 14, the subject matter of Example 13 may optionally include that the processor is further configured to control the first electronic circuit depending on a predetermined or directly measured parameter indicating a thermal interdependency between the first electronic circuit and the third electronic circuit.

In Example 15, the subject matter of any one of Examples 13 or 14 may optionally include that the processor is further configured to control the first electronic circuit depending on at least one parameter indicating thermal properties of the third electronic circuit.

In Example 16, the subject matter of any one of Examples 1 to 15 may optionally include that the at least one parameter indicating thermal properties of the first electronic circuit includes at least one parameter from a group of parameters consisting of: a parameter indicating thermal properties for heat capacity of at least a portion of the first electronic circuit, a parameter indicating thermal properties for thermal resistance of at least a portion of the first electronic circuit, a temperature of at least a portion of the first electronic circuit, a change of a temperature of at least a portion of the first electronic circuit, and workload for the first electronic circuit.

In Example 17, the subject matter of any one of Examples 1 to 16 may optionally include that the plurality of electronic circuits includes at least one electronic circuit from a group of electronic circuits consisting of: a modem, an amplifier circuit, a high frequency circuit, a mobile radio baseband circuit, a memory circuit, a radio access technology circuit, and a power management circuit.

Example 18 is a mobile radio communication device. The mobile radio communication device may include an electronic device. The electronic device may include a plurality of electronic circuits having a first electronic circuit and a second electronic circuit, and a processor configured to control the first electronic circuit depending on at least one parameter indicating thermal properties of the first electronic circuit and a predetermined parameter indicating a thermal interdependency between the first electronic circuit and the second electronic circuit. The electronic device may further include at least one antenna electrically coupled to at least one of the first electronic circuit or the second electronic circuit.

Example 19 is an electronic device. The electronic device may include a plurality of electronic circuits, and a processor configured to control at least one electronic circuit of the plurality of electronic circuits depending on a determined temperature of at least one further electronic circuit of the plurality of electronic circuits and the thermal interaction of the at least one electronic circuit with the at least one further electronic circuit.

In Example 20, the subject matter of Example 19 may optionally include that the controlled at least one electronic circuit includes the processor.

In Example 21, the subject matter of any one of Examples 19 or 20 may optionally include that the electronic device may further include a carrier, wherein the plurality of electronic circuits are mounted on the carrier.

In Example 22, the subject matter of any one of Examples 19 to 21 may optionally include that the carrier is a printed circuit board.

In Example 23, the subject matter of any one of Examples 19 to 22 may optionally include that the processor is configured to control the at least one electronic circuit to vary the performance of the at least one electronic circuit.

In Example 24, the subject matter of any one of Examples 19 to 23 may optionally include that the electronic device further includes a memory configured to store information about thermal properties of the at least one electronic circuit, thermal properties of the at least one further electronic circuit and thermal interaction between the at least one electronic circuit and the at least one further electronic circuit.

In Example 25, the subject matter of Example 24 may optionally include that the memory is configured to store information about thermal properties of each electronic circuit of the plurality of electronic circuits.

In Example 26, the subject matter of any one of Examples 24 or 25 may optionally include that the memory is configured to store information about thermal interdependencies between all the electronic circuits of the plurality of electronic circuits.

In Example 27, the subject matter of any one of Examples 24 to 26 may optionally include that the memory is further configured to store, for at least the at least one electronic circuit, an electronic circuit throttling scheme including instructions to change the functionality of the at least one electronic circuit, to thereby change the power consumption of the at least one electronic circuit.

In Example 28, the subject matter of Example 27 may optionally include that the memory is further configured to store, for each electronic circuit of the plurality of electronic circuits, a respective electronic circuit throttling scheme including instructions to change the functionality of the respective electronic circuit, to thereby change the power consumption of the respective electronic circuit.

In Example 29, the subject matter of Example 28 may optionally include that the memory is configured to store information about thermal properties of each electronic circuit of the plurality of electronic circuits, wherein the memory is configured to store information about thermal interactions between all the electronic circuits of the plurality of electronic circuits, wherein the processor is further configured to determine a temperature of at least a part of the electronic device, to determine a cooling scheme based on the stored information about thermal properties of each electronic circuit of the plurality of electronic circuits, the stored information about thermal interdependencies between all the electronic circuits of the plurality of electronic circuits, and the stored plurality of electronic circuit throttling schemes, and to control the at least one electronic circuit in accordance with the determined cooling scheme based on the determined temperature of at least a part of the electronic device.

In Example 30, the subject matter of any one of Examples 19 to 29 may optionally include that the at least one parameter indicating thermal properties of the at least one electronic circuit includes at least one parameter from a group of parameters consisting of: a parameter indicating thermal properties for heat capacity of at least a portion of the first electronic circuit, a parameter indicating thermal properties for thermal resistance of at least a portion of the first electronic circuit, a temperature of at least a portion of the first electronic circuit, a change of a temperature of at least a portion of the first electronic circuit, and workload for the first electronic circuit.

In Example 31, the subject matter of any one of Examples 19 to 30 may optionally include that the plurality of electronic circuits includes at least one electronic circuit from a group of electronic circuits consisting of a modem, an amplifier circuit, a high frequency circuit, a mobile radio baseband circuit, a memory circuit, a radio access technology circuit, and a power management circuit.

Example 32 is a mobile radio communication device. The mobile radio communication device may include an electronic device. The electronic device may include a plurality of electronic circuits, and a processor configured to control at least one electronic circuit of the plurality of electronic circuits depending on a determined temperature of the at least one electronic circuit and a determined temperature of at least one further electronic circuit of the plurality of electronic circuits and the thermal interaction of the at least one electronic circuit with the at least one further electronic circuit. The mobile radio communication device may further include at least one antenna electrically coupled to at least one electronic circuit of the plurality of electronic circuits.

Example 33 is an electronic device. The electronic device may include a plurality of chip modules, a memory configured to store information about self-heating of each chip module of the plurality of chip modules and information about cross-heating of the chip modules indicating the temperature influence of a respective chip module to one or more other chip modules, and a processor configured to control the temperature of at least one chip module based on the stored information about self-heating of the at least one chip module and the stored information about cross-heating of the chip modules.

In Example 34, the subject matter of Example 33 may optionally include that the processor is further configured to control the temperature of the at least one chip module based on the stored information about self-heating of at least one other chip module of the plurality of chip modules.

In Example 35, the subject matter of any one of Examples 33 or 34 may optionally include that the at least one chip module includes the processor.

In Example 36, the subject matter of any one of Examples 33 to 35 may optionally include that the electronic device further includes a carrier, wherein the plurality of chip modules are mounted on the carrier.

In Example 37, the subject matter of any one of Examples 33 to 36 may optionally include that the carrier is a printed circuit board.

In Example 38, the subject matter of any one of Examples 33 to 37 may optionally include that the processor is configured to control the temperature of the at least one chip module by varying the performance of the at least one chip module.

In Example 39, the subject matter of any one of Examples 33 to 38 may optionally include that the memory is further configured to store, for each chip module of the plurality of chip modules, a respective chip module throttling scheme including instructions to change the functionality of the respective chip module, to thereby change the power consumption of the respective chip module.

In Example 40, the subject matter of any one of Examples 33 to 39 may optionally include that the processor is further configured to determine a temperature of at least a part of the electronic device, to determine a cooling scheme based on the stored information about self-heating of each chip module of the plurality of chip modules, the stored information about cross-heating of the chip modules, and the stored plurality of chip module throttling schemes, and to control at least the at least one chip module in accordance with the determined cooling scheme based on the determined temperature of at least a part of the electronic device.

In Example 41, the subject matter of any one of Examples 33 to 40 may optionally include that the information about self-heating of a chip module includes at least information from a group consisting of: information indicating thermal properties for heat capacity of at least a portion of the at least one chip module, information indicating thermal properties for thermal resistance of at least a portion of the at least one chip module, a temperature of at least a portion of the at least one chip module, a change of a temperature of at least a portion of the at least one chip module, and workload for the at least one chip module.

In Example 42, the subject matter of any one of Examples 33 to 41 may optionally include that the plurality of chip modules includes at least one chip module from a group of chip modules consisting of: a modem chip, an amplifier chip, a high frequency chip, a mobile radio baseband chip, a memory chip, a radio access technology chip, and a power management chip.

Example 43 is a mobile radio communication device. The mobile radio communication device may include an electronic device. The electronic device may include a plurality of chip modules, a memory configured to store information about self-heating of each chip module of the plurality of chip modules and information about cross-heating of the chip modules indicating the temperature influence of a respective chip module to one or more other chip modules, and a processor configured to control the temperature of at least one chip module based on the stored information about self-heating of the at least one chip module and the stored information about cross-heating of the chip modules. The mobile radio communication device may further include at least one antenna electrically coupled to at least one chip module of the plurality of chip modules.

Example 44 is a method of controlling an electronic device including a plurality of electronic circuits having a first electronic circuit and a second electronic circuit. The method may include determining a temperature of at least a part of the electronic device, and controlling the first electronic circuit depending on at least one parameter indicating thermal properties of the first electronic circuit, a predetermined parameter indicating a thermal interdependency between the first electronic circuit and the second electronic circuit and the determined temperature of at least a part of the electronic device.

In Example 45, the subject matter of Example 44 may optionally include that the first electronic circuit is further controlled depending on at least one parameter indicating thermal properties of the second electronic circuit.

In Example 46, the subject matter of any one of Examples 44 or 45 may optionally include that the plurality of electronic circuits are mounted on a common carrier.

In Example 47, the subject matter of any one of Examples 44 to 46 may optionally include that the carrier is a printed circuit board.

In Example 48, the subject matter of any one of Examples 44 to 46 may optionally include that the controlling the first electronic circuit includes varying the performance of the first electronic circuit.

In Example 49, the subject matter of any one of Examples 44 to 48 may optionally include that the method further includes storing, for at least the first electronic circuit, an electronic circuit throttling scheme including instructions to change the functionality of the first electronic circuit, to thereby change the power consumption of the first electronic circuit.

In Example 50, the subject matter of Example 49 may optionally include that the method further includes storing, for at least some electronic circuits of the plurality of electronic circuits, a respective electronic circuit throttling scheme including instructions to change the functionality of the respective electronic circuit, to thereby change the power consumption of the respective electronic circuit.

In Example 51, the subject matter of Example 50 may optionally include that the method further includes storing information about thermal properties of each electronic circuit of the plurality of electronic circuits, storing information about thermal interdependencies between all the electronic circuits of the plurality of electronic circuits, determining a temperature of at least a part of the electronic device, determining a cooling scheme based on the stored information about thermal properties of each electronic circuit of the plurality of electronic circuits, the stored information about thermal interdependencies between all the electronic circuits of the plurality of electronic circuits, and the stored plurality of electronic circuit throttling schemes. The method may further include to control at least the first electronic circuit in accordance with the determined cooling scheme based on the determined temperature of at least a part of the electronic device.

In Example 52, the subject matter of any one of Examples 44 to 51 may optionally include that the plurality of electronic circuits includes a third electronic circuit, wherein the processor is further configured to control the first electronic circuit depending on a parameter indicating a thermal interdependency between the first electronic circuit and the third electronic circuit.

In Example 53, the subject matter of Example 52 may optionally include that the processor is further configured to control the first electronic circuit depending on a predetermined parameter indicating a thermal interdependency between the first electronic circuit and the third electronic circuit.

In Example 54, the subject matter of any one of Examples 52 or 53 may optionally include that the method further includes controlling the first electronic circuit depending on at least one parameter indicating thermal properties of the third electronic circuit.

In Example 55, the subject matter of any one of Examples 44 to 54 may optionally include that the at least one parameter indicating thermal properties of the first electronic circuit includes at least one parameter from a group of parameters consisting of: a parameter indicating thermal properties for heat capacity of at least a portion of the first electronic circuit, a parameter indicating thermal properties for thermal resistance of at least a portion of the first electronic circuit, a temperature of at least a portion of the first electronic circuit, a change of a temperature of at least a portion of the first electronic circuit, and workload for the first electronic circuit.

In Example 56, the subject matter of any one of Examples 44 to 55 may optionally include that the plurality of electronic circuits includes at least one electronic circuit from a group of electronic circuits consisting of: a modem, an amplifier circuit, a high frequency circuit, a mobile radio baseband circuit, a memory circuit, a radio access technology circuit, and a power management circuit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electronic device, comprising:
a memory configured to store a look-up table,
a plurality of electronic circuits including
a first electronic circuit, and
a second electronic circuit; and
at least one processor configured to control the first electronic circuit based on
a first parameter, stored in the look-up table, indicating a thermal property of the first electronic circuit, the first parameter indicating a slope of a temperature measurement signal of the first electronic circuit,
a second parameter, stored in the look-up table, indicating a thermal property of the first electronic circuit, the second parameter indicating an average temperature of the first electronic circuit, and
a predetermined parameter indicating a thermal interdependency between the first electronic circuit and the second electronic circuit, the predetermined parameter indicating a comparison of a temperature change of the first electronic circuit and power consumed by the second electronic circuit,
wherein the at least one processor is configured to control the first electronic circuit by selecting an electronic circuit throttling scheme, from a plurality of electronic circuit throttling schemes, based on the first parameter indicating the slope of the temperature measurement signal, the second parameter indicating the average temperature, and the predetermined parameter indicating the thermal interdependency between the first electronic circuit and the second electronic circuit,
wherein the selected electronic circuit throttling scheme is associated with a plurality of electronic circuit throttling classes; and
wherein the at least one processor is further configured to activate at least one electronic circuit throttling class, from the one or more electronic circuit throttling classes, in accordance with the selected electronic circuit throttling scheme and based on the first parameter indicating the slope of the temperature measurement signal and the second parameter indicating the average temperature within the stored look-up table.

2. The electronic device of claim 1,
wherein the at least one processor is further configured to control the first electronic circuit based on at least one parameter indicating thermal properties of the second electronic circuit.

3. The electronic device of claim 1, further comprising:
at least one temperature sensor configured to measure a temperature of at least a portion of at least one of the first electronic circuit or the second electronic circuit.

4. The electronic device of claim 1,
wherein the at least one processor is further configured to control a performance of the second electronic circuit based on the predetermined parameter indicating the thermal interdependency between the first electronic circuit and the second electronic circuit.

5. The electronic device of claim 1,
wherein the memory is further configured to store information about thermal properties of each electronic circuit of the plurality of electronic circuits.

6. The electronic device of claim 1,
wherein the memory is further configured to store information about thermal interdependencies between all electronic circuits of the plurality of electronic circuits,
wherein the at least one processor is further configured to select one or more electronic circuits of the plurality of electronic circuits for performance control, based on a portion of the stored information about thermal interdependencies between all electronic circuits of the plurality of electronic circuits.

7. An electronic device, comprising:
a memory configured to store a look-up table;
a plurality of electronic circuits; and
a processor configured to control at least one electronic circuit of the plurality of electronic circuits based on
   a first parameter, stored in the look-up table, indicating a thermal property of the at least one electronic circuit, the first parameter indicating a slope of a temperature measurement signal of the at least one electronic circuit,
   a second parameter, stored in the look-up table, indicating a thermal property of the at least one electronic circuit, the second parameter indicating an average temperature of the at least one electronic circuit, and
   a thermal interaction of the at least one electronic circuit with at least one further electronic circuit of the plurality of electronic circuits, the thermal interaction indicating a comparison of a temperature increase of the at least one further electronic circuit and power consumed by the at least one electronic circuit,
wherein the processor is configured to control the at least one electronic circuit by selecting an electronic circuit throttling scheme based on the first parameter indicating the slope of the temperature measurement signal, the second parameter indicating the average temperature, and the thermal interaction of the at least one electronic circuit with the at least one further electronic circuit,
wherein the selected electronic circuit throttling scheme is associated with a plurality of electronic circuit throttling classes, and
wherein the processor is further configured to determine at least one electronic circuit throttling class for activation, from the plurality of electronic circuit throttling classes, in accordance with the selected electronic circuit throttling scheme and based on the first parameter indicating the slope of the temperature measurement signal and the second parameter indicating the average temperature within the stored look-up table.

8. The electronic device of claim 7,
wherein the memory is further configured to store information about
   one or more thermal properties of the at least one electronic circuit,
   one or more thermal properties of the at least one further electronic circuit, and/or
   the thermal interaction of the at least one electronic circuit with the at least one further electronic circuit.

9. The electronic device of claim 7,
wherein the memory is further configured to store information about thermal interdependencies between all electronic circuits of the plurality of electronic circuits.

10. The electronic device of claim 7,
wherein the memory is further configured to store information about thermal properties of each electronic circuit of the plurality of electronic circuits.

11. An electronic device, comprising:
a plurality of chip modules;
a memory configured to store
   information about self-heating of at least one chip module of the plurality of chip modules in a look-up table, the stored information about self-heating of the at least one chip module including information indicating a slope of a temperature measurement signal of the at least one chip module and information indicating an average temperature of the at least one chip module, and
   information about cross-heating of the plurality of chip modules indicating a temperature influence between the at least one chip module of the plurality of chip modules and one or more other chip modules of the plurality of chip modules; and
at least one processor configured to control the at least one chip module based on the stored information about self-heating of the at one chip module and the stored information about cross-heating of the plurality of chip modules,
wherein the at least one processor is configured to control the at least one chip module by selecting a chip module throttling scheme, from a plurality of chip module throttling schemes, based on the stored information indicating the slope of the temperature measurement signal, the stored information indicating the average temperature, and the stored information about cross-heating of the plurality of chip modules,
wherein the selected chip module throttling scheme is associated with one or more chip module throttling classes, and
wherein the at least one processor is further configured to activate at least one chip module throttling class, from the one or more chip module throttling classes, in accordance with the selected chip module throttling scheme and based on the stored information indicating the slope of the temperature measurement signal and the stored information indicating the average temperature within the stored look-up table.

12. The electronic device of claim 11,
wherein the memory is further configured to store, for each chip module of the plurality of chip modules, a respective chip module throttling scheme and information to change a power consumption of the respective chip module.

13. The electronic device of claim 1,
wherein at least one electronic circuit throttling class of the plurality of electronic circuit throttling classes has a plurality of electronic circuit throttling mechanisms associated therewith, and
wherein at least one electronic circuit throttling mechanism of the plurality of electronic circuit throttling mechanisms is configured to reduce power consumption of the electronic device.

14. The electronic device of claim 1, further comprising:
at least one temperature sensor configured to measure a temperature of at least a portion of the first electronic circuit; and
a noise filtering circuit configured to generate the temperature measurement signal by filtering the measured temperature from the at least one temperature sensor.

15. The electronic device of claim 13,
wherein at least two different electronic circuit throttling classes of the plurality of electronic circuit throttling classes share a common electronic circuit throttling mechanism of the plurality of electronic circuit throttling mechanisms.

16. The electronic device of claim 11,
wherein the memory is further configured to store information about cross-heating of a further chip module of the plurality of chip modules,
wherein the stored information about cross-heating of the further chip module indicates a temperature influence of the further chip module to the at least one chip module, and
wherein the at least one processor is further configured to control a performance the further chip module based on the stored information about cross-heating of the further chip module satisfying a criteria.

17. The electronic device of claim 16,
wherein the criteria is satisfied when the stored information about cross-heating of the further chip module exceeds a threshold value.

18. The electronic device of claim 1,
wherein the memory is further configured to store information about cross-heating of a further electronic circuit of the plurality of electronic circuits,
wherein the stored information about cross-heating of the further electronic circuit indicates a temperature influence of the further electronic circuit to the first electronic circuit, and
wherein the at least one processor is further configured to control a performance the further electronic circuit based on the stored information about cross-heating of the further electronic circuit satisfying a criteria.

19. The electronic device of claim 18,
wherein the criteria is satisfied when the stored information about cross-heating of the further electronic circuit exceeds a threshold value.

20. The electronic device of claim 7,
wherein the memory is further configured to store information about cross-heating of a further electronic circuit of the plurality of electronic circuits,
wherein the stored information about cross-heating of the further electronic circuit indicates a temperature influence of the further electronic circuit to the at least one electronic circuit, and
wherein the at least one processor is further configured to control a performance the further electronic circuit based on the stored information about cross-heating of the further electronic circuit satisfying a criteria.

21. The electronic device of claim 20,
wherein the criteria is satisfied when the stored information about cross-heating of the further electronic circuit exceeds a threshold value.

* * * * *